(12) United States Patent
El-Kady et al.

(10) Patent No.: US 10,847,852 B2
(45) Date of Patent: Nov. 24, 2020

(54) HYBRID ELECTROCHEMICAL CELL

(71) Applicant: The Regents of the University of California, Oakland, CA (US)

(72) Inventors: Maher F. El-Kady, Los Angeles, CA (US); Richard B. Kaner, Pacific Palisades, CA (US)

(73) Assignee: The Regents of the University of California, Oakland, CA (US)

( * ) Notice: Subject to any disclaimer, the term of this patent is extended or adjusted under 35 U.S.C. 154(b) by 127 days.

(21) Appl. No.: 16/223,869

(22) Filed: Dec. 18, 2018

(65) Prior Publication Data

US 2019/0123409 A1  Apr. 25, 2019

Related U.S. Application Data

(62) Division of application No. 15/319,286, filed as application No. PCT/US2015/036082 on Jun. 16, 2015, now Pat. No. 10,211,495.

(Continued)

(51) Int. Cl.
*H01M 4/02* (2006.01)
*H01M 14/00* (2006.01)
(Continued)

(52) U.S. Cl.
CPC ............ *H01M 14/00* (2013.01); *H01G 11/02* (2013.01); *H01G 11/04* (2013.01); *H01G 11/06* (2013.01);
(Continued)

(58) Field of Classification Search
CPC ...................................... H01M 4/02
See application file for complete search history.

(56) References Cited

U.S. PATENT DOCUMENTS

| 2,800,616 A | 7/1957 | Becker |
| 3,288,641 A | 11/1966 | Rightmire |

(Continued)

FOREIGN PATENT DOCUMENTS

| CN | 100372035 C | 2/2008 |
| CN | 101723310 A | 6/2010 |

(Continued)

OTHER PUBLICATIONS

Examination Report for European Patent Application No. 13757195.6, dated Jan. 29, 2020, 4 pages.

(Continued)

*Primary Examiner* — Jacob B Marks
(74) *Attorney, Agent, or Firm* — Withrow & Terranova, P.L.L.C.

(57) ABSTRACT

Disclosed is a hybrid electrochemical cell with a first conductor having at least one portion that is both a first capacitor electrode and a first battery electrode. The hybrid electrochemical cell further includes a second conductor having at least one portion that is a second capacitor electrode and at least one other portion that is a second battery electrode. An electrolyte is in contact with both the first conductor and the second conductor. In some embodiments, the hybrid electrochemical cell further includes a separator between the first conductor and the second conductor to prevent physical contact between the first conductor and the second conductor, while facilitating ion transport between the first conductor and the second conductor.

20 Claims, 13 Drawing Sheets

Related U.S. Application Data

(60) Provisional application No. 62/012,835, filed on Jun. 16, 2014.

(51) Int. Cl.

| | | |
|---|---|---|
| *H01M 4/38* | (2006.01) | |
| *H01M 4/485* | (2010.01) | |
| *H01M 4/505* | (2010.01) | |
| *H01M 4/525* | (2010.01) | |
| *H01M 4/58* | (2010.01) | |
| *H01M 4/587* | (2010.01) | |
| *H01M 10/052* | (2010.01) | |
| *H01M 10/30* | (2006.01) | |
| *H01M 4/13* | (2010.01) | |
| *H01M 12/00* | (2006.01) | |
| *H01G 11/06* | (2013.01) | |
| *H01G 11/26* | (2013.01) | |
| *H01G 11/32* | (2013.01) | |
| *H01G 11/50* | (2013.01) | |
| *H01G 11/04* | (2013.01) | |
| *H01G 11/30* | (2013.01) | |
| *H01G 11/02* | (2013.01) | |
| *H01G 11/08* | (2013.01) | |
| *H01G 11/46* | (2013.01) | |
| *H01G 11/52* | (2013.01) | |
| *H01G 11/86* | (2013.01) | |
| *H01M 10/0525* | (2010.01) | |
| *H01M 10/34* | (2006.01) | |

(52) U.S. Cl.
CPC .............. *H01G 11/08* (2013.01); *H01G 11/26* (2013.01); *H01G 11/30* (2013.01); *H01G 11/32* (2013.01); *H01G 11/46* (2013.01); *H01G 11/50* (2013.01); *H01G 11/52* (2013.01); *H01G 11/86* (2013.01); *H01M 4/13* (2013.01); *H01M 4/386* (2013.01); *H01M 4/485* (2013.01); *H01M 4/505* (2013.01); *H01M 4/525* (2013.01); *H01M 4/587* (2013.01); *H01M 4/5825* (2013.01); *H01M 10/052* (2013.01); *H01M 10/0525* (2013.01); *H01M 10/30* (2013.01); *H01M 10/345* (2013.01); *H01M 12/00* (2013.01); *Y02E 60/13* (2013.01)

(56) References Cited

U.S. PATENT DOCUMENTS

| | | | |
|---|---|---|---|
| 3,536,963 | A | 10/1970 | Boos |
| 3,652,902 | A | 3/1972 | Hart et al. |
| 4,327,157 | A | 4/1982 | Himy et al. |
| 5,225,296 | A | 7/1993 | Ohsawa et al. |
| 5,442,197 | A | 8/1995 | Andrieu et al. |
| 6,043,630 | A | 3/2000 | Koenck et al. |
| 6,117,585 | A | 9/2000 | Anani et al. |
| 6,252,762 | B1 | 6/2001 | Amatucci |
| 6,451,074 | B2 | 9/2002 | Bluvstein et al. |
| 6,510,043 | B1 | 1/2003 | Shiue et al. |
| 6,522,522 | B2 | 2/2003 | Yu et al. |
| 6,982,517 | B2 | 1/2006 | Reineke et al. |
| 7,623,340 | B1 | 11/2009 | Song et al. |
| 7,833,663 | B2 | 11/2010 | Phillips et al. |
| 7,875,219 | B2 | 1/2011 | Zhamu et al. |
| 8,315,039 | B2 | 11/2012 | Zhamu et al. |
| 8,503,161 | B1 | 8/2013 | Chang et al. |
| 8,593,714 | B2 | 11/2013 | Agrawal et al. |
| 8,753,772 | B2 | 6/2014 | Liu et al. |
| 8,771,630 | B2 | 7/2014 | Wu et al. |
| 8,828,608 | B2 | 9/2014 | Sun et al. |
| 8,906,495 | B2 | 12/2014 | Chen |
| 8,951,675 | B2 | 2/2015 | Bhardwaj et al. |
| 9,118,078 | B2 | 8/2015 | Huang et al. |
| 9,295,537 | B2 | 3/2016 | Cao |
| 9,437,372 | B1 | 9/2016 | Zhamu et al. |
| 2002/0136881 | A1 | 9/2002 | Yanagisawa et al. |
| 2002/0160257 | A1 | 10/2002 | Lee et al. |
| 2003/0013012 | A1 | 1/2003 | Ahn et al. |
| 2003/0169560 | A1 | 9/2003 | Welsch et al. |
| 2004/0090736 | A1 | 5/2004 | Bendale et al. |
| 2005/0153130 | A1 | 7/2005 | Long et al. |
| 2006/0121342 | A1 | 6/2006 | Sano et al. |
| 2006/0201801 | A1 | 9/2006 | Bartlett et al. |
| 2006/0207878 | A1 | 9/2006 | Myung et al. |
| 2006/0269834 | A1 | 11/2006 | West et al. |
| 2007/0172739 | A1 | 7/2007 | Visco et al. |
| 2007/0204447 | A1 | 9/2007 | Bernstein et al. |
| 2008/0090141 | A1 | 4/2008 | Meitav et al. |
| 2008/0158778 | A1 | 7/2008 | Lipka et al. |
| 2008/0180883 | A1 | 7/2008 | Palusinski et al. |
| 2008/0199737 | A1 | 8/2008 | Kazaryan et al. |
| 2008/0220293 | A1 | 9/2008 | Marmaropoulos et al. |
| 2009/0059474 | A1 | 3/2009 | Zhamu et al. |
| 2009/0117467 | A1 | 5/2009 | Zhamu et al. |
| 2009/0289328 | A1 | 11/2009 | Tanioku |
| 2010/0159346 | A1 | 6/2010 | Hinago et al. |
| 2010/0159366 | A1 | 6/2010 | Shao-Horn et al. |
| 2010/0195269 | A1 | 8/2010 | Kim et al. |
| 2010/0203362 | A1 | 8/2010 | Lam et al. |
| 2010/0221508 | A1 | 9/2010 | Huang et al. |
| 2010/0226066 | A1 | 9/2010 | Sweeney et al. |
| 2010/0237296 | A1 | 9/2010 | Gilje |
| 2010/0266964 | A1 | 10/2010 | Gilje |
| 2010/0273051 | A1 | 10/2010 | Choi et al. |
| 2010/0317790 | A1 | 12/2010 | Jang et al. |
| 2011/0026189 | A1 | 2/2011 | Wei et al. |
| 2011/0111283 | A1 | 5/2011 | Rust, III et al. |
| 2011/0111299 | A1 | 5/2011 | Liu et al. |
| 2011/0143101 | A1 | 6/2011 | Sandhu |
| 2011/0159372 | A1 | 6/2011 | Zhamu et al. |
| 2011/0163274 | A1 | 7/2011 | Plee et al. |
| 2011/0163699 | A1 | 7/2011 | Elder et al. |
| 2011/0183180 | A1 | 7/2011 | Yu et al. |
| 2011/0227000 | A1 | 9/2011 | Ruoff et al. |
| 2011/0256454 | A1 | 10/2011 | Nicolas et al. |
| 2011/0318257 | A1 | 12/2011 | Sokolov et al. |
| 2012/0111730 | A1 | 5/2012 | Choi et al. |
| 2012/0129736 | A1 | 5/2012 | Tour et al. |
| 2012/0134072 | A1 | 5/2012 | Bae et al. |
| 2012/0145234 | A1 | 6/2012 | Roy-Mayhew et al. |
| 2012/0300364 | A1 | 11/2012 | Cai et al. |
| 2012/0313591 | A1 | 12/2012 | Brambilla et al. |
| 2013/0026409 | A1* | 1/2013 | Baker ............... H01M 10/0567 252/62.2 |
| 2013/0048949 | A1 | 2/2013 | Xia et al. |
| 2013/0056346 | A1 | 3/2013 | Sundara et al. |
| 2013/0056703 | A1 | 3/2013 | Elian et al. |
| 2013/0100581 | A1 | 4/2013 | Jung et al. |
| 2013/0161570 | A1 | 6/2013 | Hwang et al. |
| 2013/0168611 | A1 | 7/2013 | Zhou et al. |
| 2013/0171502 | A1 | 7/2013 | Chen et al. |
| 2013/0180912 | A1 | 7/2013 | Li |
| 2013/0182373 | A1 | 7/2013 | Yu et al. |
| 2013/0189602 | A1 | 7/2013 | Lahiri et al. |
| 2013/0217289 | A1 | 8/2013 | Nayfeh et al. |
| 2013/0264041 | A1 | 10/2013 | Zhamu et al. |
| 2013/0266858 | A1 | 10/2013 | Inoue et al. |
| 2013/0280601 | A1 | 10/2013 | Geramita et al. |
| 2013/0314844 | A1 | 11/2013 | Chen et al. |
| 2013/0330617 | A1 | 12/2013 | Yoshimura et al. |
| 2014/0029161 | A1 | 1/2014 | Beidaghi et al. |
| 2014/0030590 | A1 | 1/2014 | Wang et al. |
| 2014/0045058 | A1 | 2/2014 | Zhao et al. |
| 2014/0065447 | A1 | 3/2014 | Liu et al. |
| 2014/0099558 | A1 | 4/2014 | Itakura et al. |
| 2014/0118883 | A1 | 5/2014 | Xie |
| 2014/0120453 | A1 | 5/2014 | Ajayan et al. |
| 2014/0154164 | A1 | 6/2014 | Chen et al. |
| 2014/0170476 | A1 | 6/2014 | Tan et al. |
| 2014/0178763 | A1 | 6/2014 | Mettan |

(56) References Cited

U.S. PATENT DOCUMENTS

| | | |
|---|---|---|
| 2014/0205841 A1 | 7/2014 | Qui et al. |
| 2014/0255776 A1 | 9/2014 | Song et al. |
| 2014/0255785 A1 | 9/2014 | Do et al. |
| 2014/0287308 A1 | 9/2014 | Okada et al. |
| 2014/0313636 A1 | 10/2014 | Tour et al. |
| 2014/0323596 A1 | 10/2014 | Jeong et al. |
| 2015/0098167 A1 | 4/2015 | El-Kady et al. |
| 2015/0103469 A1 | 4/2015 | Lee et al. |
| 2015/0111449 A1 | 4/2015 | Cruz-Silva et al. |
| 2015/0218002 A1 | 8/2015 | Plomb et al. |
| 2015/0235776 A1 | 8/2015 | Miller |
| 2015/0259212 A1 | 9/2015 | Li et al. |
| 2015/0287544 A1 | 10/2015 | Irazoqui et al. |
| 2015/0332868 A1 | 11/2015 | Jung et al. |
| 2015/0364738 A1 | 12/2015 | Pope et al. |
| 2015/0364755 A1 | 12/2015 | Liu et al. |
| 2016/0035498 A1 | 2/2016 | Honma et al. |
| 2016/0055983 A1 | 2/2016 | Kurungot et al. |
| 2016/0077074 A1 | 3/2016 | Strong et al. |
| 2016/0099116 A1 | 4/2016 | Yang |
| 2016/0133396 A1 | 5/2016 | Hsieh |
| 2016/0148759 A1 | 5/2016 | El-Kady et al. |
| 2017/0240424 A1 | 8/2017 | Roberts et al. |
| 2017/0338472 A1 | 11/2017 | Zhamu et al. |
| 2019/0006675 A1 | 1/2019 | Cheng et al. |
| 2019/0088420 A1 | 3/2019 | Tour et al. |
| 2019/0284403 A1 | 9/2019 | Kaner et al. |
| 2020/0090880 A1 | 3/2020 | Kaner et al. |

FOREIGN PATENT DOCUMENTS

| | | |
|---|---|---|
| CN | 101894679 A | 11/2010 |
| CN | 102187413 A | 9/2011 |
| CN | 102509632 A | 6/2012 |
| CN | 102543483 A | 7/2012 |
| CN | 102923698 A | 2/2013 |
| CN | 103208373 A | 7/2013 |
| CN | 103723715 A | 4/2014 |
| CN | 203631326 U | 6/2014 |
| CN | 203839212 U | 9/2014 |
| CN | 104299794 A | 1/2015 |
| CN | 104355306 A | 2/2015 |
| CN | 104617300 A | 5/2015 |
| CN | 104637694 A | 5/2015 |
| EP | 1843362 A1 | 10/2007 |
| EP | 2088637 A2 | 8/2009 |
| EP | 2933229 A1 | 10/2015 |
| JP | S61010855 A | 1/1986 |
| JP | S62287568 A | 12/1987 |
| JP | 2002063894 A | 2/2002 |
| JP | 2003217575 A | 7/2003 |
| JP | 2004039491 A | 2/2004 |
| JP | 2004055541 A | 2/2004 |
| JP | 2004063297 A | 2/2004 |
| JP | 2005138204 A | 6/2005 |
| JP | 2005199267 A | 7/2005 |
| JP | 20050317902 A | 11/2005 |
| JP | 2006252902 A | 9/2006 |
| JP | 2007160151 A | 6/2007 |
| JP | 2009525247 A | 7/2009 |
| JP | 2010222245 A | 10/2010 |
| JP | 2011026153 A | 2/2011 |
| JP | 2011165680 A | 8/2011 |
| JP | 2012169576 A | 9/2012 |
| JP | 2013534686 A | 9/2013 |
| JP | 2014053209 A | 3/2014 |
| KR | 20070083691 A | 8/2007 |
| KR | 10-2009-0107498 A | 10/2009 |
| KR | 1020100114827 B1 | 4/2017 |
| WO | 9632618 A1 | 10/1996 |
| WO | 2011019431 A1 | 2/2011 |
| WO | 2011021982 A1 | 2/2011 |
| WO | 2011072213 A2 | 6/2011 |
| WO | 2012006657 A1 | 1/2012 |
| WO | 2012087698 A1 | 6/2012 |
| WO | 2012138302 A1 | 10/2012 |
| WO | 2013024727 A1 | 2/2013 |
| WO | 2013040636 A1 | 3/2013 |
| WO | 2013066474 A2 | 5/2013 |
| WO | 2013070989 A1 | 5/2013 |
| WO | 2013128082 A1 | 9/2013 |
| WO | 2013155276 A1 | 10/2013 |
| WO | 2014011722 A2 | 1/2014 |
| WO | 2014062133 A1 | 4/2014 |
| WO | 2014072877 A2 | 5/2014 |
| WO | 2014134663 A1 | 9/2014 |
| WO | 2015023974 A1 | 2/2015 |
| WO | 2015069332 A1 | 5/2015 |
| WO | 2015153895 A1 | 10/2015 |
| WO | 2015195700 A1 | 12/2015 |
| WO | 2016094551 A1 | 6/2016 |

OTHER PUBLICATIONS

Office Action for Brazilian Patent Application No. 112016029468, dated Jan. 21, 2020, 6 pages.

Third Office Action for Chinese Patent Application No. 201580043429.1, dated Jan. 3, 2020, 20 pages.

Office Action for Israeli Patent Application No. 249506, dated Dec. 3, 2019, 8 pages.

Office Action for Brazilian Patent Application No. 112017010257, dated Jan. 28, 2020, 7 pages.

First Office Action for Chinese Patent Application No. 2017800076125, dated Nov. 28, 2019, 20 pages.

International Preliminary Report on Patentability for International Patent Application No. PCT/US2018/041728, dated Jan. 23, 2020, 7 pages.

Final Office Action for U.S. Appl. No. 15/466,425, dated Jan. 28, 2020, 8 pages.

Supplemental Notice of Allowability for U.S. Appl. No. 14/945,232, dated Feb. 12, 2020, 5 pages.

Non-Final Office Action for U.S. Appl. No. 15/427,210, dated Feb. 28, 2019, 17 pages.

Examination Report for European Patent Application No. 12874989.2, dated Mar. 5, 2019, 5 pages.

Notice of Reasons for Rejection for Japanese Patent Application No. 2016-573846, dated Feb. 26, 2019, 8 pages.

Search Report for Japanese Patent Application No. 2016-573846, dated Feb. 28, 2019, 44 pages.

Examination Report No. 1 for Australian Patent Application No. 2015349949, dated Mar. 8, 2019, 4 pages.

Final Office Action for U.S. Appl. No. 15/410,404, dated Feb. 21, 2019, 9 pages.

International Preliminary Report on Patentability for International Patent Application No. PCT/US2017/048883, dated Mar. 14, 2019, 7 pages.

Cannarella et al., "Mechanical Properties of a Battery Separator under Compression and Tension," Journal of the Electrochemical Society, vol. 161, No. 11, Sep. 26, 2014, pp. F3117-F3122.

Non-Final Office Action for U.S. Appl. No. 15/427,210, dated Sep. 3, 2019, 16 pages.

Applicant-Initiated Interview Summary for U.S. Appl. No. 16/029,930, dated Jul. 29, 2019, 4 pages.

Notice of Preliminary Rejection for Korean Patent Application No. 10-2014-7028084, dated Aug. 22, 2019, 30 pages.

Notice of Acceptance for Australian Patent Application No. 2015277264, dated Jul. 31, 2019, 3 pages.

Non-Final Office Action for U.S. Appl. No. 14/945,232, dated Sep. 3, 2019, 8 pages.

Notification of the Third Office Action for Chinese Patent Application No. 201580072540.3, dated Jul. 17, 2019, 9 pages.

Notification of Reasons for Rejection for Japanese Patent Application No. 2017-526533, dated Aug. 20, 2019, 4 pages.

Non-Final Office Action for U.S. Appl. No. 15/382,871, dated Sep. 16, 2019, 9 pages.

Non-Final Office Action for U.S. Appl. No. 16/428,409, dated Sep. 16, 2019, 12 pages.

(56) References Cited

OTHER PUBLICATIONS

Author Unknown, "Sulfuric Acid—Density," The Engineering Toolbox, accessed Apr. 10, 2020 at https://www.engineeringtoolbox.com/indsulfuric-acid-density-d_2163_html, 6 pages.
Dubal, D. P., et al., "Hybrid energy storage: the merging of battery and supercapacitor chemistries," Chemical Society Review, vol. 44, No. 7, 2015, pp. 1777-1790.
Garg, R. et al., "Nanowire Mesh Templated Growth of Out-of-Plane Three-Dimensional Fuzzy Graphene," ACS Nano, vol. 11, 2017, American Chemical Society, pp. 6301-6311.
Gong, M., et al., "Ultrafast high-capacity NiZn battery with NiAlCo-layered double hydroxide," Energy & Environmental Science, vol. 7, No. 6, 2014, pp. 2025-2032.
Humble, P. H., et al., "Microscopic nickel-zinc batteries for use in autonomous microsystems," Journal of the Electrochemical Society, vol. 148, No. 12, 2001, pp. A1357-A1361.
Kang, J.H et al., "Hidden Second Oxidation Step of Hummers Method," Chemistry of Materials, vol. 28, 2016, American Chemical Society, pp. 756-764.
Li, Qintao et al., "Carbon nanotubes coated by carbon nanoparticles of turbostratic stacked graphenes," Carbon, vol. 46, 2008, Elsevier Ltd., pp. 434-439.
Mishra, G., et al., "Layered double hydroxides: A brief review from fundamentals to application as evolving biomaterials," Applied Clay Science, vol. 153, 2018, Elsevier B.V., pp. 172-186.
Parker, J. F., et al. "Rechargeable nickel-3D zinc batteries: An energy-dense, safer alternative to lithium-ion," Science, vol. 356, No. 6336, 2017, American Association for the Advancement of Science, pp. 415-418.
Non-Final Office Action for U.S. Appl. No. 15/688,342, dated Apr. 9, 2020, 10 pages.
Final Office Action for U.S. Appl. No. 15/630,758, dated Apr. 15, 2020, 13 pages.
Non-Final Office Action for U.S. Appl. No. 16/033,266, dated Apr. 29, 2020, 12 pages.
Office Action for Eurasian Patent Application No. 201790003, dated Feb. 26, 2020, 6 pages.
Examination Report No. 1 for Australian Patent Application No. 2019250120, dated Apr. 24, 2020, 4 pages.
Partial Supplemental European Search Report for European Patent Application No. 17847303.9, dated Apr. 3, 2020, 10 pages.
Decision of Rejection for Chinese Patent Application No. 201580072540.3, dated Apr. 22, 2020, 8 pages.
Park, S. et al., "Colloidal Suspensions of Highly Reduced Graphene Oxide in a Wide Variety of Organic Solvents," Nano Letters, vol 9, No. 4, 2009, American Chemical Society, pp. 1593-1597.
Applicant-Initiated Interview Summary for U.S. Appl. No. 15/427,210, dated May 29, 2019, 3 pages.
Notice of Reexamination for Chinese Patent Application No. 201280070343.4, dated Jun. 27, 2019, 14 pages.
Non-Final Office Action for U.S. Appl. No. 15/612,405, dated Jun. 18, 2019, 12 pages.
Notification of the Second Office Action for Chinese Patent Application No. 201580043429.1, dated Jun. 20, 2019, 9 pages.
Final Office Action for U.S. Appl. No. 14/945,232, dated Jul. 17, 2019, 8 pages.
Notice of Acceptance for Australian Patent Application No. 2015349949, dated Jul. 12, 2019, 3 pages.
Notice of Allowance for U.S. Appl. No. 15/382,871, dated May 17, 2019, 10 pages.
Extended European Search Report for European Patent Application No. 16879927.8, dated Jul. 9, 2019, 14 pages.
Non-Final Office Action for U.S. Appl. No. 15/410,404, dated May 24, 2019, 9 pages.
Partial Supplementary European Search Report for European Patent Application No. 17741923.1, dated Jul. 23, 2019, 13 pages.
Non-Final Office Action for U.S. Appl. No. 15/472,409, dated May 31, 2019, 12 pages.
Non-Final Office Action for U.S. Appl. No. 15/466,425, dated Jul. 10, 2019, 8 pages.
Notice of Reexamination for Chinese Patent Application No. 201280070343.4, dated Feb. 3, 2020, 7 pages.
Notice of Preliminary Rejection for Korean Patent Application No. 10-2014-7028084, dated Feb. 17, 2020, 5 pages.
Examination Report for Indian Patent Application No. 201617042976, dated Mar. 13, 2020, 7 pages.
Office Action for Mexican Patent Application No. MX/a/2016/016239, dated Feb. 26, 2020, 5 pages.
Notification of Reasons for Rejection for Japanese Patent Application No. 2017-526533, dated Mar. 16, 2020, 7 pages.
Second Office Action for Chinese Patent Application No. 2016800753323, dated Mar. 5, 2020, 15 pages.
First Office Action for Chinese Patent Application No. 2017800249783, dated Jan. 6, 2020, 15 pages.
Supplemental Notice of Allowability for U.S. Appl. No. 14/945,232, dated Feb. 26, 2020, 5 pages.
Office Action for Eurasian Patent Application No. 201990587/31, dated Mar. 26, 2020, 4 pages.
Huang, L. et al., "Pulsed laser assisted reduction of graphene oxide," Carbon, vol. 49, 2011, Elsevier, pp. 2431-2436.
Kumar, P. et al., "Graphene produced by radiation-induced reduction of graphene oxide," Sep. 26, 2010, DOI:DOI:10.1142/S0219581X11008824, 23 pages.
Notice of Preliminary Rejection for Korean Patent Application No. 10-2014-7020353, dated Apr. 15, 2019, 11 pages.
Non-Final Office Action for U.S. Appl. No. 16/029,930, dated Apr. 3, 2019, 13 pages.
Examination Report No. 1 for Australian Patent Application No. 2015277264, dated Mar. 7, 2019, 4 pages.
Interview Summary for U.S. Appl. No. 14/945,232, dated Apr. 11, 2019, 3 pages.
Notification of the Second Office Action for Chinese Patent Application No. 201580072540.3, dated Mar. 7, 2019, 12 pages.
Official Action for Eurasian Patent Application No. 201791078, dated Mar. 27, 2019, 5 pages.
Interview Summary for U.S. Appl. No. 15/382,871, dated Apr. 1, 2019, 10 pages.
Advisory Action for U.S. Appl. No. 15/382,871, dated Apr. 24, 2019, 3 pages.
Non-Final Office Action for U.S. Appl. No. 15/688,342, dated Mar. 26, 2019, 9 pages.
Luo, Zhi-Jia et al., "A timesaving, low-cost, high-yield method for the synthesis of ultrasmall uniform graphene oxide nanosheets and their application in surfactants," Nanotechnology, vol. 27, Issue 5, Dec. 16, 2015, IOP Publishing Ltd, pp. 1-8.
Maiti, Sandipan et al., "Interconnected Network of $MnO_2$ Nanowires with a "Cocoonlike" Morphology: Redox Couple-Mediated Performance Enhancement in Symmetric Aqueous Supercapacitor," ACS Applied Materials & Interfaces, vol. 6, Issue 13, Jun. 16, 2014, American Chemical Society, pp. 10754-10762.
Maiti, Uday Narayan et al., "Three-Dimensional Shape Engineered, Interfacial Gelation of Reduced Graphene Oxide for High Rate, Large Capacity Supercapacitors," vol. 26, Issue 4, Jan. 29, 2014, WILEY-VCH Verlag GmbH & Co., pp. 615-619.
Mao, Lu et al., "Surfactant-stabilized graphene/polyaniline nanofiber composites for high performance supercapacitor electrode," Journal of Materials Chemistry, vol. 22, Issue 1, Oct. 12, 2011, The Royal Society of Chemistry, pp. 80-85.
Marcano, Daniela C. et al., "Improved Synthesis of Graphene Oxide," ACS Nano, vol. 4, Issue 8, Jul. 22, 2010, American Chemical Society, pp. 4806-4814.
Miller, John R. et al., "Electrochemical Capacitors for Energy Management," Materials Science, vol. 321, Aug. 1, 2008, AAAS, pp. 651-652.
Moosavifard, Seyyed E. et al., "Designing 3D highly ordered nanoporous CuO electrodes for high-performance asymmetric supercapacitors," ACS Applied Materials & Interfaces, vol. 7, Issue 8, American Chemical Society, 13 pages.
Moussa, Mahmoud et al, "Free-Standing Composite Hydrogel Film for Superior Volumetric Capacitance," Journal of Materials Chemistry A, vol. 3, Issue 30, Jun. 19, 2015, The Royal Society of Chemistry, pp. 1-8.

(56) References Cited

OTHER PUBLICATIONS

Naoi, Katsuhiko et al., "Second generation 'nanohybrid supercapacitor': Evolution of capacitive energy storage devices," Energy & Environmental Science, vol. 5, Issue 11, Sep. 14, 2012, The Royal Society of Chemistry, pp. 9363-9373.
Nathan, Arokia et al., "Flexible Electronics: The Next Ubiquitous Platform," Proceedings of the IEEE, vol. 100, Special Centennial Issue, May 13, 2012, IEEE, pp. 1486-1517.
Niu, Zhiqiang et al., "A Leavening Strategy to Prepare Reduced Graphene Oxide Foams," Advanced Materials, vol. 24, Issue 30, Aug. 8, 2012, WILEY-VCH Verlag GmbH & Co., pp. 1-7.
Oudenhoven, Jos F. M. et al., "All-Solid-State Lithium-Ion Microbatteries: A Review of Various Three-Dimensional Concepts," Advanced Energy Matterials, vol. 1, Issue 1, WILEY-VCH Verlag GmbH & Co. KGaA, Weinheim, pp. 10-33.
Paravannoor, Anjali et al., "High voltage supercapacitors based on carbon-grafted NiO nanowires interfaced with an aprotic ionic liquid," Chemical Communications, vol. 51, Issue 28, Feb. 26, 2015, The Royal Society of Chemistry, pp. 1-4.
Patel, Mehul N. et al., "Hybrid $MnO_2$-disordered mesoporous carbon nanocomposites: synthesis and characterization as electrochemical pseudocapacitor electrodes," Journal of Materials Chemistry, vol. 20, Issue 2, Nov. 11, 2009, The Royal Society of Chemistry, pp. 390-398.
Pech, David et al, "Ultrahigh-power micrometre-sized supercapacitors based on onion-like carbon," Nature Nanotechnology, vol. 5, Sep. 2010, Macmillan Publishers Limited, 10 pages.
Pendashteh, Afshin et al., "Fabrication of anchored copper oxide nanoparticles on graphene oxide nanosheets via an electrostatic coprecipitation and its application as supercapacitor," Electrochimica Acta, vol. 88, Oct. 29, 2012, Elsevier Ltd., pp. 347-357.
Pendashteh, Afshin et al., "Facile synthesis of nanostructured $CuCo_2O_4$ as a novel electrode material for high-rate supercapacitors," vol. 50, Issue 16, Dec. 17, 2013, The Royal Society of Chemistry, 4 pages.
Pendashteh, Afshin et al., "Highly Ordered Mesoporous $CuCo_2O_4$ Nanowires, a Promising Solution for High-Performance Supercapacitors," Chemistry of Materials, vol. 27, Issue 11, Apr. 20, 2015, American Chemical Society, pp. 1-11.
Qing, Xutang et al., "P/N/O co-doped carbonaceous materials based supercapacitor with voltage up to 1.9 V in the aqueous electrolyte," RSC Advances, vol. 4, Issue 99, Oct. 21, 2014, Royal Society of Chemistry, pp. 1-22.
Qiu, Ling et al., "Controllable Corrugation of Chemically Converted Graphene Sheets in Water and Potential Application for Nanofiltration," Chemical Communications, vol. 47, 2011, pp. 5810-5812.
Qu, Qunting et al., "Core-Shell Structure of Polypyrrole Grown on $V_2O_5$ Nanoribbon as High Performance Anode Material for Supercapacitors," Advanced Energy Materials, vol. 2, Issue 8, 2012, WILEY-VCH Verlag GmbH & Co., pp. 1-6.
Raccichini, Rinaldo et al., "The role of graphene for electrochemical energy storage," Nature Materials, vol. 14, Issue 3, Dec. 22, 2014, Macmillan Publishers Limited, pp. 1-9.
Samitsu, Sadaki et al., "Flash freezing route to mesoporous polymer nanofibre networks," Nature Communications, vol. 4, Issue 2653, Oct. 22, 2013, Macmillan Publishers Limited, pp. 1-7.
Shae, Yuanlong et al., "Fabrication of large-area and high-crystallinity photoreduced graphene oxide films via reconstructed two-dimensional multilayer structures," NPG Asia Materials, vol. 6, Issue 8, e119, Aug. 15, 2014, Nature Publishing Group, pp. 1-9.
Shao, Yuanlong et al., "Graphene-based materials for flexible supercapacitors," Chemical Society Review, vol. 44, Issue 11, Apr. 22, 2015, The Royal Society of Chemistry, 27 pages.
Shao, Yuanlong et al., "High-performance flexible asymmetric supercapacitors based on 3D porous graphene/$MnO_2$, nanorod and graphene/Ag hybrid thin-film electrodes," Journal of Materials Chemistry C, vol. 1, Dec. 5, 2012, The Royal Society of Chemistry, pp. 1245-1251.

Sheats, James R., "Manufacturing and commercialization issues in organic electronics," Journal of Materials Research, vol. 19, Issue 7, Jul. 2004, Materials Research Society, pp. 1974-1989.
Shen, Caiwei et al., "A high-energy-density micro supercapacitor of asymmetric $MnO_2$-carbon configuration by using micro-fabrication technologies," Journal of Power Sources, vol. 234, Feb. 9, 2013, Elsevier B.V., pp. 302-309.
Shen, Jiali et al., "High-Performance Asymmetric Supercapacitor Based on Nano-architectured Polyaniline/Graphene/Carbon Nanotube and Activated Graphene Electrodes," ACS Applied Materials & Interfaces, vol. 5, Issue 17, Aug. 9, 2013, American Chemical Society, 36 pages.
Shown, Indrajit et al., "Conducting polymer-based flexible supercapacitor," Energy Science & Engineering, vol. 3, Issue 1, Nov. 19, 2014, Society of Chemical Industry and John Wiley & Sons Ltd., pp. 1-25.
Simon, P. et al., "Capacitive Energy Storage in Nanostructured Carbon-Electrolyte Systems," Accounts of Chemical Research, vol. 46, Issue 5, Jun. 6, 2012, American Chemical Society, 10 pages.
Simon, Patrice et al., "Materials for electrochemical capacitors," Nature Materials, vol. 7, Issue 11, Nov. 2008, Macmillan Publishers Limited, pp. 845-854.
Simon, Patrice et al., "Where Do Batteries End and Supercapacitors Begin?" Science, vol. 343, Issue 6176, Mar. 14, 2014, American Association for the Advancement of Science, 3 pages.
Snook, Graeme A. et al., "Conducting-polymer-based supercapacitor devices and electrodes," Journal of Power Sources, vol. 196, Jul. 15, 2010, Elsevier B.V., pp. 1-12.
Stoller, Meryl D. et al., "Graphene-Based Ultracapacitors," Nano Letters, vol. 8, Issue 10, Sep. 13, 2008, American Chemical Society, pp. 3498-3502.
Strong, Veronica et al., "Patterning and Electronic Tuning of Laser Scribed Graphene for Flexible All-Carbon Devices," ACS Nano, vol. 6, Issue 2, Jan. 13, 2012, American Chemical Society, p. 1395-1403.
Su, Zijin et al., "Scalable fabrication of $MnO_2$ nanostructure deposited on free-standing Ni nanocone arrays for ultrathin, flexible, high-performance micro-supercapacitor," Energy and Environmental Science, vol. 7, May 28, 2014, The Royal Society of Chemistry, pp. 2652-2659.
Sumboja, Afriyanti et al., "Large Areal Mass, Flexible and Free-Standing Reduced Graphene Oxide/Manganese Dioxide Paper for Asymmetric Supercapacitor Device," Advanced Materials, vol. 25, Issue 20, May 28, 2013, WILEY-VCH Verlag GmbH & Co. KGaA, Weinheim, pp. 2809-2815.
Tian, Yuyu et al., "Synergy of $W_{18}O_{49}$ and Polyaniline for Smart Supercapacitor Electrode Integrated with Energy Level Indicating Functionality," Nano Letters, vol. 14, Issue 4, Mar. 4, 2014, American Chemical Society, pp. 2150-2156.
Toupin, Mathieu et al., "Charge Storage Mechanism of $MnO_2$ Electrode Used in Aqueous Electrochemical Capacitor," Chemistry of Materials, vol. 16, Issue 16, Jul. 16, 2004, American Chemical Society, pp. 3184-3190.
Tran, Henry D. et al., "The oxidation of aniline to produce "polyaniline": a process yielding many different nanoscale structures," Journal of Materials Chemistry, vol. 21, Issue 11, Nov. 25, 2010, The Royal Society of Chemistry, pp. 3534-3550.
Viculis, Lisa M. et al., "A Chemical Route to Carbon Nanoscrolls," Science, vol. 299, Issue 5611, Feb. 28, 2003, American Association for the Advancement of Science, 2 pages.
Vonlanthen, David et al., "A Stable Polyaniline-Benzoquinone-Hydroquinone Supercapacitor," Advanced Materials, vol. 26, Issue 30, Jun. 13, 2014, WILEY-VCH Verlag GmbH & Co., pp. 1-6.
Wallace, Gordon G. et al., "Processable aqueous dispersions of graphene nanosheets," Nature Nanotechnology, vol. 3, Issue 2, 2008, Nature Publishing Group, pp. 101-105.
Wang, Gongkai et al., "Flexible Pillared Graphene-Paper Electrodes for High-Performance Electrochemical Supercapacitors," Small, vol. 8, Issue 3, Dec. 8, 2011, pp. 452-459.
Wang, Guoping et al, "A review of electrode materials for electrochemical supercapacitors," Chemical Society Reviews, vol. 41, Jul. 21, 2011, The Royal Society of Chemistry, pp. 797-828.

(56) References Cited

OTHER PUBLICATIONS

Wang, Guoxiu et al., "Graphene nanosheets for enhanced lithium storage in lithium ion batteries," Carbon, vol. 47, Issue 8, Apr. 1, 2009, Elsevier Ltd., pp. 2049-2053.
Wang, Hailiang et al., "$Mn_3O_4$-Graphene Hybrid as a High-Capacity Anode Material for Lithium Ion Batteries," Journal of the American Chemical Society, vol. 132, Issue 40, Oct. 13, 2010, American Chemical Society, pp. 13978-13980.
Wang, Huanlei et al., "Graphene—Nickel Cobaltite Nanocomposite Asymmetrical Supercapacitor with Commercial Level Mass Loading," Nano Research, vol. 5, Issue 9, Sep. 2012, Tsinghua University Press and Springer-Verlag Berlin Heidelberg, pp. 605-617.
Wang, Kai et al., "Flexible supercapacitors based on cloth-supported electrodes of conducting polymer nanowire array/SWCNT composites," Journal of Materials Chemistry, vol. 21, Issue 41, Sep. 20, 2011, The Royal Society of Chemistry, pp. 16373-16378.
Wang, Xu et al., "Manganese Oxide Micro-Supercapacitors with Ultra-high Areal Capacitance,"Electronic Supplementary Material (ESI) for Nanoscale, vol. 5, Mar. 21, 2013, The Royal Society of Chemistry, 6 pages.
Wang, Xuebin et al., "Three-dimensional strutted graphene grown by substrate-free sugar blowing for high-power-density supercapacitors," Nature Communications, vol. 4, Issue 2905, Dec. 16, 2013, Macmillan Publishers Limited, pp. 1-8.
Wassei, Jonathan K. et al., "Oh the Places You'll Go with Graphene", Accounts of Chemical Research, Dec. 20, 2012, Vers. 9, 11 pages.
Weng, Zhe et al., "Graphene-Cellulose Paper Flexible Supercapacitors," Advanced Energy Materials, vol. 1, Issue 5, Aug. 10, 2011, WILEY-VCH Verlag GmbH & Co., pp. 917-922.
Wu, Zhong-Shuai et al., "Graphene Anchored with $Co_3O_4$ Nanoparticles as Anode of Lithium Ion Batteries with Enhanced Reversible Capacity and Cyclic Performance," ACS Nano, vol. 4, Issue 6, May 10, 2010, American Chemical Society, pp. 3187-3194.
Xie, Guoxin, "Direct Electrochemical Synthesis of Reduced Graphene Oxide (rGO)/Copper Composite Films and Their Electrical/Electroactive Properties," Applied Materials & Interfaces, vol. 6, Issue 10, May 1, 2014, American Chemical Society, pp. 7444-7455.
Xu, Bin et al., "Sustainable nitrogen-doped porous carbon with high surface areas prepared from gelatin for supercapacitors," Journal of Materials Chemistry, vol. 22, Issue 36, Jul. 25, 2012, The Royal Society of Chemistry, pp. 19088-19093.
Xu, Jing et al., "Flexible Asymmetric Supercapacitors Based upon $Co_9S_8$ Nanorod//$Co_3O_4$@$RuO_2$ Nanosheet Arrays on Carbon Cloth," ACS Nano, vol. 7, Issue 6, May 6, 2013, American Chemical Society, pp. 5453-5462.
Xu, Yuxi et al., "Flexible Solid-State Supercapacitors Based on Three-Dimensional Graphene Hydrogel Films," ACS Nano, vol. 7, Issue 5, Apr. 4, 2013, American Chemical Society, 8 pages.
Xu, Zhanwei et al., "Electrochemical Supercapacitor Electrodes from Sponge-like Graphene Nanoarchitectures with Ultrahigh Power Density," The Journal of Physical Chemistry Letters, vol. 3, Issue 20, Sep. 25, 2012, American Chemical Society, pp. 2928-2933.
Yan, Jun et al., "Fast and reversible surface redox reaction of graphene-MnO2composites as supercapacitor electrodes," Carbon, vol. 48, Issue 13, Jun. 25, 2010, Elsevier Ltd., pp. 3825-3833.
Yan, Jun et al., "Recent Advances in Design and Fabrication of Electrochemical Supercapacitors with High Energy Densities," Advanced Energy Materials, vol. 4, Issue 4, 1300816, Dec. 23, 2013, WILEY-VCH Verlag GmbH & Co., pp. 1-43.
Yang, Xiaowei et al, "Bioinspired Effective Prevention of Restacking in Multilayered Graphene Films: Towards the Next Generation of High-Performance Supercapacitors," Advanced Materials, vol. 23, Issue 25, May 10, 2011, WILEY-VCH Verlag GmbH & Co., pp. 2833-2838.
Yang, Peihua et al., "Low-Cost High-Performance Solid-State Asymmetric Supercapacitors Based on $MnO_2$ Nanowires and $Fe_2O_3$ Nanotubes," Nano Letters, vol. 14, Issue 2, Jan. 1, 2014, American Chemical Society, pp. 731-736.
Yang, Xiaowei et al, "Liquid-Mediated Dense Integration of Graphene Materials for Compact Capacitive Energy Storage," Science, vol. 341, Issue 6145, Aug. 2, 2013, American Association for the Advancement of Science, 5 pages.
Yoo, Eunjoo et al., "Large Reversible Li Storage of Graphene Nanosheet Families for Use in Rechargeable Lithium Ion Batteries," Nano Letters, vol. 8, Issue 8, Jul. 24, 2008, American Chemical Society, pp. 2277-2282.
Yoo, Jung Joon et al., "Ultrathin Planar Graphene Supercapacitors," Nano Letters, vol. 11, Issue 4, Mar. 7, 2011, American Chemical Society, pp. 1423-1427.
Yu, Dingshan et al., "Scalable synthesis of hierarchically structured carbon nanotube-graphene fibres for capacitive energy storage," Nature Nanotechnology, vol. 9, Issue 7, May 11, 2014, Macmillan Publishers Limited, pp. 1-8.
Yu, Guihua et al., "Solution-Processed Graphene/$MnO_2$ Nanostructured Textiles for High-Performance Electrochemical Capacitors," Nano Letters, vol. 11, Issue 7, Jun. 13, 2011, American Chemical Society, pp. 2905-2911.
Yu, Pingping et al., "Graphene-Wrapped Polyaniline Nanowire Arrays on Nitrogen-Doped Carbon Fabric as Novel Flexible Hybrid Electrode Materials for High-Performance Supercapacitor," Langmuir, vol. 30, Issue 18, Apr. 24, 2014, American Chemical Society, pp. 5306-5313.
Yu, Pingping et al., "Polyaniline Nanowire Arrays Aligned on Nitrogen-Doped Carbon Fabric for High-Performance Flexible Supercapacitors," Langmuir, vol. 29, Issue 38, Aug. 28, 2013, American Chemical Society, 8 pages.
Yu, Zenan et al., "Supercapacitor electrode materials: nanostructures from 0 to 3 dimensions," Energy & Environmental Science, vol. 8, Issue 3, Dec. 3, 2014, The Royal Society of Chemistry, pp. 702-730.
Zhang, Jintao et al., "A high-performance asymmetric supercapacitor fabricated with graphene-based electrodes," Energy & Environmental Science, vol. 4, Issue 10, Aug. 2, 2011, The Royal Society of Chemistry, pp. 4009-4015.
Zhang, Li et al., "High Voltage Super-capacitors for Energy Storage Devices Applications," 14th Symposium on Electromagnetic Launch Technology, Jun. 10-13, 2008, IEEE, pp. 1-4.
Zhang, Long et al., "Porous 3D graphene-based bulk materials with exceptional high surface area and excellent conductivity for supercapacitors," Scientific Reports, vol. 3, Issue 1408, Mar. 11, 2013, Nature Publishing Group, pp. 1-9.
Zhang, Yonglai et al., "Direct imprinting of microcircuits on graphene oxides film by femtosecond laser reduction," Nano Today, vol. 5, Issue 1, Jan. 19, 2010, Elsevier Ltd., pp. 15-20.
Zhang, Zheye et al., "Facile Synthesis of 3D $MnO_2$-Graphene and Carbon Nanotube-Graphene Composite Networks for High-Performance, Flexible, All-Solid-State Asymmetric Supercapacitors," Advanced Energy Materials, vol. 4, Issue 10, Jul. 15, 2014, WILEY-VCH Verlag GmbH & Co. KGaA, Weinheim, pp. 1-9.
Zhang, Zhongshen et al., "A New-Type Ordered Mesoporous Carbon/Polyaniline Composites Prepared by a Two-step Nanocasting Method for High Performance Supercapacitor Applications," Journal of Materials Chemistry A, vol. 2, Issue 39, Aug. 13, 2014, Royal Society of Chemistry, pp. 1-25.
Zhao, Xin et al., "Incorporation of Manganese Dioxide within Ultraporous Activated Graphene for High-Performance Electrochemical Capacitors," ACS Nano, vol. 6, Issue 6, May 3, 2012, American Chemical Society, pp. 5404-5412.
Zhi, Mingjia et al, "Nanostructured carbon-metal oxide composite electrodes for supercapacitors: a review," vol. 5, Issue 1, Oct. 23, 2012,The Royal Society of Chemistry, pp. 72-88.
Zhou, Chuanqiang et al., "Synthesis of Polyaniline Hierarchical Structures in a Dilute SDS/HCl Solution: Nanostructure-Covered Rectangular Tubes," Macromolecules, vol. 42, Issue 4, Jan. 27, 2009, American Chemical Society, pp. 1252-1257.
Zhou, Guangmin et al., "Graphene-Wrapped $Fe_3O_4$ Anode Material with Improved Reversible Capacity and Cyclic Stability for Lithium Ion Batteries," Chemistry of Materials, vol. 22, Issue 18, Aug. 26, 2010, American Chemical Society, pp. 5306-5313.
Zhu, Xianjun et al., "Nanostructured Reduced Graphene Oxide/$Fe_2O_3$, Composite as a High-Performance Anode Material for

(56) References Cited

OTHER PUBLICATIONS

Lithium Ion Batteries," ACS Nano, vol. 5, Issue 4, Mar. 28, 2011, American Chemical Society, pp. 3333-3338.
Zhu, Yanwu et al., "Carbon-Based Supercapacitors Produced by Activation of Graphene," Science, vol. 332, May 12, 2011, www.sciencemag.org, pp. 1537-1541.
Zoski, Cynthia G., "Handbook of Electrochemistry," First Edition, 2007, Las Cruces, New Mexico, USA, Elsevier B.V., 935 pages.
Non-Final Office Action for U.S. Appl. No. 13/725,073, dated Apr. 15, 2016, 32 pages.
Final Office Action for U.S. Appl. No. 13/725,073, dated Oct. 4, 2016, 38 pages.
First Examination Report for Australian Patent Application No. 2012378149, dated Jul. 28, 2016, 3 pages.
First Office Action for Chinese Patent Application No. 201280070343.4, dated Jul. 23, 2015, 29 pages.
Second Office Action for Chinese Patent Application No. 201280070343.4, dated Apr. 6, 2016, 8 pages.
Third Office Action for Chinese Patent Application No. 201280070343.4, dated Sep. 7, 2016, 25 pages.
Extended European Search Report for European Patent Application No. 12874989.2, dated Jun. 17, 2015, 6 pages.
Notice of Reason for Rejection for Japanese Patent Application No. 2014-548972, dated Feb. 7, 2017, 5 pages.
International Search Report and Written Opinion for PCT/US2012/071407, dated Nov. 12, 2013, 9 pages.
International Preliminary Report on Patentability for PCT/US2012/071407 dated Jul. 3, 2014, 6 pages.
Non-Final Office Action for U.S. Appl. No. 14/382,463, dated Jan. 6, 2017, 23 pages.
Notice of Allowance for U.S. Appl. No. 14/382,463, dated Apr. 6, 2017, 7 pages.
First Examination Report for Australian Patent Application No. 2013230195, dated May 27, 2016, 4 pages.
First Office Action and Search Report for Chinese Patent Application No. 201380023699.7, dated Nov. 21, 2016, 21 pages.
Extended European Search Report for European Patent Application No. 13757195.6, dated Jul. 1, 2015, 9 pages.
Acerce, Muharrem et al., "Metallic 1T phase $MoS_2$ nanosheets as supercapacitor electrode materials," Nature Nanotechnology, vol. 10, Mar. 23, 2015, Macmillan Publishers Limited, pp. 1-6.
Allen, Matthew J. et al., "Honeycomb Carbon: A Review of Graphene," Chemical Reviews, vol. 110, Issue 1, Jul. 17, 2009, American Chemical Society, pp. 132-145.
Augustyn, Veronica et al., "High-rate electrochemical energy storage through $Li^+$ intercalation pseudocapacitance," Nature Materials, vol. 12, Jun. 2013, www.nature.com/naturematerials, Macmillan Publishers Limited, pp. 518-522.
Author Unknown, "125 Volt Transportation Module," Maxwell Technologies, retrieved Apr. 13, 2016, website last modified Mar. 14, 2013, www.maxwell.com/products/ultracapacitors/125v-tranmodules, Maxwell Technologies, Inc., 2 pages.
Author Unknown, "ELTON: Super Capactiors," www.elton-cap.com/, Retrieved Apr. 15, 2016, ELTON, 1 page.
Author Unknown, "ELTON: Products and Technology," https://web.archive.org/web/20160306044847/http:/www.elton-cap.com/products/, dated Mar. 6, 2016, retrieved Mar. 15, 2017, ELTON, 2 pages.
Author Unknown, "Monthly battery sales statistics," Battery Association of Japan (BAJ), retrieved Apr. 13, 2016, website last modified Dec. 2010, web.archive.org/web/20110311224259/http://www.baj.or.jp/e/statistics/02.php, Battery Association of Japan, 1 page.
Author Unknown, "Turnigy Graphene Batteries," Batteries & Accessories, https://hobbyking.com/en_us/batteries-acessories/turnigy-graphene-2.html, retrieved Apr. 3, 2017, HobbyKing, 39 pages.
Arthur, Timothy, S. et al., "Three-dimensional electrodes and battery architectures," MRS Bulletin, vol. 36, Jul. 2011, Materials Research Society, pp. 523-531.

Bai, Ming-Hua et al., "Electrodeposition of vanadium oxide-polyaniline composite nanowire electrodes for high energy density supercapacitors," Journal of Materials Chemistry A, vol. 2, Issue 28, Jan. 29, 2014, The Royal Society of Chemistry, pp. 10882-10888.
Beidaghi, Majid, et al., "Capacitive energy storage in micro-scale devices: recent advances in design and fabrication of micro-supercapacitors," Energy and Environmental Science, vol. 7, Issue 3, Jan. 2, 2014, Royal Society of Chemistry, pp. 867-884.
Beidaghi, Majid et al., "Micro-Supercapacitors Based on Interdigital Electrodes of Reduced Graphene Oxide and Carbon Nanotube Composites with Ultra high Power Handling Performance," Advanced Functional Materials, vol. 22, Issue 21, Nov. 2, 2012, WILEY-VCH Verlag GmbH & Co. KGaA, Weinheim, pp. 4501-4510.
Beidaghi, Majid et al., "Micro-supercapacitors based on three dimensional interdigital polypyrrole/C-MEMS electrodes," Electrochimica Acta, vol. 56, Issue 25, Oct. 30, 2011, Elsevier Ltd., pp. 9508-9514.
Bélanger, Daniel et al., "Manganese Oxides: Battery Materials Make the Leap to Electrochemical Capacitors," Electrochemical Society Interface, vol. 17, Issue 1, Spring 2008, The Electrochemical Society, pp. 49-52.
Bian, Li-Jun et al., "Self-doped polyaniline on functionalized carbon cloth as electroactive materials for supercapacitor," Electrochimica Acta, vol. 64, Dec. 29, 2011, Elsevier Ltd., pp. 17-22.
Bouville, Florian et al., "Strong, tough and stiff bioinspired ceramics from brittle constituents," Nature Materials, vol. 13, Issue 5, Mar. 23, 2014, Macmillan Publishers Limited, pp. 1-7.
Brain, Marshall et al., "How Batteries Work," Battery Arrangement and Power—HowStuffWorks, http://electronics.howstuffworks.com/everyday-tech/battery6.htm/printable, accessed Dec. 14, 2015, HowStuffWorks, 4 pages.
Brodie, B.C., "Ueber das Atomgewicht des Graphits," Justus Liebigs Annalen der Chemie, vol. 114, Issue 1, 1860, WILEY-VCH Verlag GmbH & Co. KGaA, Weinheim, pp. 6-24.
Burke, Andrew, "R&D considerations for the performance and application of electrochemical capacitors," Electrochimica Acta, vol. 53, Jan. 26, 2007, Elsevier Ltd., pp. 1083-1091.
Cao, Liujun et al., "Direct Laser-Patterned Micro-Supercapacitors from Paintable $MoS_2$ Films," Small, vol. 9, Issue 17, Apr. 16, 2013, WILEY-VCH Verlag GmbH & Co. KGaA, Weinheim, pp. 2905-2910.
Chan, Candace K. et al, "High-performance lithium battery anodes using silicon nanowires," Nature Nanotechnology, vol. 3, Issue 1, Jan. 2008, Nature Publishing Group, pp. 31-35.
Chen, Cheng-Meng et al., "Macroporous 'bubble' graphene film via template-directed ordered-assembly for high rate supercapacitors," Chemical Communications, vol. 48, Issue 57, May 15, 2012, The Royal Society of Chemistry, pp. 1-3.
Chen, Ji et al., "High-yield preparation of graphene oxide from small graphite flakes via an improved Hummers method with a simple purification process," Carbon, vol. 81, Jan. 2015, Elsevier Ltd., pp. 1-9.
Chen, L. Y. et al., "Toward the Theoretical Capacitance of $RuO_2$ Reinforced by Highly Conductive Nanoporous Gold," Advanced Energy Materials, vol. 3, Issue 7, Jul. 2014, WILEY-VCH Verlag GmbH & Co. KGaA, Weinheim, pp. 851-856.
Chen, Wei et al., "High-Performance Nanostructured Supercapacitors on a Sponge," Nano Letters, vol. 11, Issue 12, Sep. 16, 2011, American Chemical Society, 22 pages.
Chen, Zongping et al, "Three-dimensional flexible and conductive interconnected graphene networks grown by chemical vapour deposition," Nature Materials, vol. 10, Issue 6, Jun. 2011, Macmillan Publishers Limited, pp. 424-428.
Cheng, Yingwen et al., "Synergistic Effects from Graphene and Carbon Nanotubes EnableFlexible and Robust Electrodes for High-PerformanceSupercapacitors," Nano Letters, vol. 12, Issue 8, Jul. 23, 2012, American Chemical Society, pp. 4206-4211.
Chi, Kai et al., "Freestanding Graphene Paper Supported Three-Dimensional Porous Graphene-Polyaniline Nanocomposite Synthesized by Inkjet Printing and in Flexible All-Solid-State Supercapacitor," ACS Applied Materials & Interfaces, vol. 6, Issue 18, Sep. 10, 2014, American Chemical Society, 8 pages.

(56) References Cited

OTHER PUBLICATIONS

Chmiola, John et al., "Monolithic Carbide-Derived Carbon Films for Micro-Supercapacitors," Science, vol. 328, Issue 5977, Apr. 2010, American Association for the Advancement of Science, 4 pages.
Choi, Bong Gill et al., "3D Macroporous Graphene Frameworks for Supercapacitors with High Energy and Power Densities," ACS Nano, vol. 6, Issue 5, Apr. 23, 2012, American Chemical Society, pp. 4020-4028.
Cooper, A. et al., "The UltraBattery—A new battery design for a new beginning in hybrid electric vehicle energy storage," Journal of Power Sources, vol. 188, Issue 2, Dec. 6, 2008, Elsevier B.V. pp. 642-649.
Deville, Sylvain, "Freeze-Casting of Porous Ceramics: A Review of Current Achievements and Issues," Advanced Engineering Materials, vol. 10, Issue 3, Mar. 20, 2008, WILEY-VCH Verlag GmbH & Co., pp. 155-169.
Deville, Sylvain, "Metastable and unstable cellular solidification of colloidal suspensions," Nature Materials, vol. 8, Dec. 2009, Macmillan Publishers Limited, pp. 966-972.
De Volder, Michaël et al., "Corrugated Carbon Nanotube Microstructures with Geometrically Tunable Compliance," ACS Nano, vol. 5, Issue 9, Aug. 1, 2011, pp. 7310-7317.
Dunn, Bruce et al., "Electrical Energy Storage for the Grid: A Battery of Choices," Science, vol. 334, Issue 928, Nov. 18, 2011, American Association for the Advancement of Science, pp. 928-935.
Eda, Goki et al., "Chemically Derived Graphene Oxide: Towards Large-Area Thin-Film Electronics and Optoelectronics," Advanced Materials, vol. 22, Issue 22, Apr. 28, 2010, WILEY-VCH Verlag GmbH & Co., pp. 2392-2415.
El-Kady, Maher F. et al., "Engineering Three-Dimensional Hybrid Supercapacitors and Micro-Supercapacitors for High-Performance Integrated Energy Storage," Proceedings of the National Academy of Sciences of the United States of America, vol. 112, Issue 14, Apr. 7, 2015, National Academy of Sciences, pp. 4233-4238.
El-Kady, Maher F. et al., "Laser Scribing of High-Performance and Flexible Graphene-Based Electrochemical Capacitors," Science Magazine, Mar. 16, 2012, vol. 335, No. 6074, 6 pages.
El-Kady, Maher F. et al., "Laser Scribing of High-Performance and Flexibile Graphene-Based Electrochemical Capacitors," Science, vol. 335, Issue 6074, Mar. 16, 2012, www.sciencemag.org/cgi/content/full/335/6074/1326/DC1, American Association for the Advancement of Science, 25 pages.
El-Kady, Maher F. et al., "Scalable Fabrication of High-Power Graphene Micro-Supercapacitors for Flexible and On-Chip Energy Storage," Nature Communications, vol. 4, Issue 1475, Feb. 12, 2013, Macmillan Publishers Limited, pp. 1-9.
El-Kady, Maher F. et al., "Supplementary Information: Scalable Fabrication of High-Power Graphene Micro-Supercapacitors for Flexible and On-Chip Energy Storage", Nature Communications, Submitted for Publication: Oct. 1, 2012, 23 pages.
Fan, Zhuangjun et al., "Asymmetric Supercapacitors Based on Graphene/$MnO_2$ and Activated Carbon Nanofiber Electrodes with High Power and Energy Density," Advanced Functional Materials, vol. 21, Issue 12, Jun. 21, 2011, WILEY-VCH Verlag GmbH & Co. KGaA, Weinheim, pp. 2366-2375.
Feng, Jun et al., "Metallic Few-Layered $VS_2$ Ultrathin Nanosheets: High Two-Dimensional Conductivity for In-Plane Supercapacitors," Journal of the American Chemical Society, vol. 133, Issue 44, Sep. 27, 2011, American Chemical Society, pp. 17832-17838.
Fischer, Anne F. et al., "Incorporation of Homogeneous, Nanoscale $MnO_2$ within Ultraporous Carbon Structures via Self-Limiting Electroless Deposition: Implications for Electrochemical Capacitors," Nano Letters, vol. 7, Issue 2, Jan. 13, 2007, American Chemical Society, pp. 281-286.
Foo, Ce Yao et al., "Flexible and Highly Scalable $V_2O_5$-rGO Electrodes in an Organic Electrolyte for Supercapacitor Devices," Advanced Energy Materials, vol. 4, Issue 12, Aug. 26, 2014, WILEY-VCH Verlag GmbH & Co. KGaA, Weinheim, pp. 1-7.
Gan, Shiyu et al., "Spontaneous and Fast Growth of Large-Area Graphene Nanofilms Facilitated by Oil/Water Interfaces," Advanced Materials, vol. 24, Issue 29, Jun. 12, 2012, WILEY-VCH Verlag GmbH & Co, pp. 3958-3964.
Gao, Wei et al., "Direct laser writing of micro-supercapacitors on hydrated graphite oxide films," Nature Nanotechnology, vol. 6, Issue 8, Jul. 2011, Macmillan Publishers Limited, p. 496-500.
Gao, Wei et al., "Direct laser writing of micro-supercapacitors on hydrated graphite oxide films," Supplementary Information, Nature Nanotechnology, vol. 6, Issue 8, Jul. 2011, Macmillan Publishers Limited, 15 pages.
Gao, Hongcai et al., "Flexible All-Solid-State Asymmetric Supercapacitors Based on Free-Standing Carbon Nanotube/Graphene and $Mn_3O_4$ Nanoparticle/Graphene Paper Electrodes," Applied Materials & Interfaces, vol. 4, Issue 12, Nov. 20, 2012, American Chemical Society, pp. 7020-7026.
Gao, Hongcai et al., "High-Performance Asymmetric Supercapacitor Based on Graphene Hydrogel and Nanostructured $MnO_2$," ACS Applied Materials and Interfaces, vol. 4, Issue 5, Apr. 30, 2012, American Chemical Society, pp. 2801-2810.
Gao, C. et al., "Superior Cycling Performance of $SiO_x$/C Composite with Arrayed Mesoporous Architecture as Anode Material for Lithium-Ion Batteries," Journal of The Electrochemical Society, vol. 161, No. 14, 2014, The Electrochemical Society, pp. A2216-A2221.
Vranes, M. et al., "Physicochemical Characterization of 1-Butyl-3-methylimidazolium and 1-Butyl-1-methylpyrrolidinium Bis{trifluoromethylsulfonyl)imide," Journal of Chemical & Engineering Data, vol. 57, Mar. 7, 2012, American Chemical Society, pp. 1072-1077.
Notice of Allowance for U.S. Appl. No. 15/427,210, dated Dec. 18, 2019, 9 pages.
Grant of Patent for Korean Patent Application No. 10-2014-7020353, dated Oct. 29, 2019, 3 pages.
Final Office Action for U.S. Appl. No. 15/612,405, dated Dec. 27, 2019, 17 pages.
Office Action for Canadian Patent Application No. 2,866,250, dated Dec. 17, 2019, 3 pages.
Examination Report for European Patent Application No. 15809519.0, dated Dec. 9, 2019, 7 pages.
Notice of Allowance for U.S. Appl. No. 14/945,232, dated Dec. 20, 2019, 9 pages.
Official Action for Eurasian Patent Application No. 201791078, dated Nov. 6, 2019, 4 pages.
Applicant-Initiated Interview Summary for U.S. Appl. No. 15/382,871, dated Dec. 31, 2019, 5 pages.
Corrected Notice of Allowability for U.S. Appl. No. 15/410,404, dated Dec. 3, 2019, 6 pages.
Non-Final Office Action for U.S. Appl. No. 16/692,123, dated Dec. 27, 2019, 11 pages.
Notice of Allowance for U.S. Appl. No. 15/472,409, dated Dec. 11, 2019, 11 pages.
Official Action for Eurasian Patent Application No. 201892199, dated Nov. 28, 2019, 6 pages.
Extended European Search Report for European Paetnt Application No. 17816292.1, dated Jan. 7, 2020, 9 pages.
Examination Report for Indian Patent Application No. 201817044642, dated Nov. 26, 2019, 7 pages.
Official Action for Eurasian Patent Application No. 201892118, dated Nov. 28, 2019, 4 pages.
Gao, Yu et al., "High power supercapcitor electrodes based on flexible TiC-CDC nano-felts," Journal of Power Sources, vol. 201, Issue 1, Mar. 2012, Elsevier B.V., pp. 368-375.
Gao, Lijun et al., "Power Enhancement of an Actively Controlled Battery/Ultracapacitor Hybrid," IEEE Transactions on Power Electronics, vol. 20, Issue 1, Jan. 2005, IEEE, pp. 236-243.
Ghasemi, S. et al., "Enhancement of electron transfer kinetics on a polyaniline-modified electrode in the presence of anionic dopants," Journal of Solid State Electrochemistry, vol. 12, Issue 3, Jul. 28, 2007, Springer-Verlag, pp. 259-268.
Ghidiu, Michael et al., "Conductive two-dimensional titanium carbide 'clay' with high volumetric capacitance," Nature, vol. 516, Dec. 4, 2014, Macmillan Publishers Limited, pp. 78-81.

(56) References Cited

OTHER PUBLICATIONS

Gilje, Scott et al., "A Chemical Route to Graphene for Device Applications," Nano Letters, vol. 7, Issue 11, Oct. 18, 2007, American Chemical Society, pp. 3394-3398.
Gilje, Scott et al., "Photothermal Deoxygenation of Graphene Oxide for Patterning and Distributed Ignition Applications," Advanced Materials, vol. 22, Issue 3, Oct. 26, 2009, WILEY-VCH Verlag GmbH & Co. KGaA, Weinheim, Germany, pp. 419-423.
Glavin, M.E. et al, "A Stand-alone Photovoltaic Supercapacitor Battery Hybrid Energy Storage System," Proceedings of the 13th International Power Electronics and Motion Control Conference (EPE-PEMC), Sep. 1-3, 2008, Poznań, Poland, IEEE, pp. 1688-1695.
Gogotsi, Y. et al., "True Performance Metrics in Electrochemical Energy Storage," Science Magazine, vol. 334, Issue 6058, Nov. 18, 2011, 4 pages.
Gracia, J. et al., "Corrugated layered heptazine-based carbon nitride: the lowest energy modifications of $C_3N_4$ ground state," Journal of Materials Chemistry, vol. 19, 2009, pp. 3013-3019.
Griffiths, Katie et al., "Laser-scribed graphene presents an opportunity to print a new generation of disposable electrochemical sensors," Nanoscale, vol. 6, Sep. 22, 2014, The Royal Society of Chemistry, pp. 13613-13622.
Guardia, L. et al., "UV light exposure of aqueous graphene oxide suspensions to promote their direct reduction, formation of graphene-metal nanoparticle hybrids and dye degradation," Carbon, vol. 50, Issue 3, Oct. 12, 2011, Elsevier Ltd., pp. 1014-1024.
Guerrero-Contreras, Jesus et al., "Graphene oxide powders with different oxidation degree, prepared by synthesis variations of the Hummers method," Materials Chemistry and Physics, vol. 153, Mar. 1, 2015, Elsevier B.V., pp. 1-12.
Günes, Fethullah et al., "Layer-by-Layer Doping of Few-Layer Graphene Film," ACS Nano, vol. 4, Issue 8, Jul. 27, 2010, American Chemical Society, pp. 4595-4600.
He, Xinping et al., "A new nanocomposite: Carbon cloth based polyaniline for an electrochemical supercapacitor," Electrochimica Acta, vol. 111, Aug. 17, 2013, Elsevier Ltd., pp. 210-215.
Hu, Liangbing et al., "Symmetrical $MnO_2$—Carbon Nanotube-Textile Nanostructures for Wearable Pseudocapacitors with High Mass Loading," ACS Nano, vol. 5, Issue 11, Sep. 16, 2011, American Chemical Society, pp. 8904-8913.
Huang, Yi et al., "An Overview of the Applications of Graphene-Based Materials in Supercapacitors," Small, vol. 8, Issue 12, Jun. 25, 2012, WILEY-VCH Verlag GmbH & Co. KGaA, Weinheim, pp. 1-30.
Huang, Ming et al., "Self-Assembly of Mesoporous Nanotubes Assembled from Interwoven Ultrathin Birnessite-type $MnO_2$ Nanosheets for Asymmetric Supercapacitors," Scientific Reports, vol. 4, Issue 3878, Jan. 27, 2014, ww.nature.com/scientificreports, pp. 1-8.
Hwang, Jee Y. et al., "Direct preparation and processing of graphene/$RuO_2$ nanocomposite electrodes for high-performance capacitive energy storage," Nano Energy, vol. 18, Sep. 25, 2015, Elsevier B.V., pp. 57-70.
Jana, Milan et al., "Non-covalent functionalization of reduced graphene oxide using sulfanilic acid azocromotrop and its application as a supercapacitor electrode material," Journal of Materials Chemistry A, vol. 3, Issue 14, Feb. 24, 2015, The Royal Society of Chemistry, pp. 7323-7331.
Ji, Junyi et al., "Nanoporous $Ni(OH)_2$ Thin Film on 3D Ultrathin-Graphite Foam for Asymmetric Supercapacitor," ACS Nano, vol. 7, Issue 7, Jun. 11, 2013, American Chemical Society, pp. 6237-6243.
Jimbo, "Transistors," Sparkfun, https://learn.sparkfun.com/tutorials/transistors/extending-the-water-analogy, accessed Dec. 14, 2015, SparkFun Electronics, 3 pages.
Jin, H. Y. et al., "Controllable functionalized carbon fabric for high-performance all-carbon-based supercapacitors," RSC Advances, vol. 4, Issue 62, Jul. 15, 2014, The Royal Society of Chemistry, pp. 33022-33028.
Kang, Yu Jin et al., "All-solid-state flexible supercapacitors based on papers coated with carbon nanotubes and ionic-liquid-based gel electrolytes," Nanotechnology, vol. 23, Issue 6, Jan. 17, 2012, IOP Publishing Ltd, pp. 1-6.
Khaligh, Alireza et al., "Battery, Ultracapacitor, Fuel Cell, and Hybrid Energy Storage Systems for Electric, Hybrid Electric, Fuel Cell, and Plug-In Hybrid Electric Vehicles: State of the Art," IEEE Transactions on Vehicular Technology, vol. 59, Issue 6, Jul. 2010, IEEE, pp. 2806-2814.
Khomenko, V. et al., "Optimisation of an asymmetric manganese oxide/activated carbon capacitor working at 2 V in aqueous medium," Journal of Power Sources, vol. 153, Issue 1, Mar. 14, 2005, Elsevier B.V., pp. 183-190.
Kiani, Mohammad Ali et al., "Fabrication of High Power LiNi0.5Mn1.5O4 Battery Cathodes by Nanostructuring of Electrode Materials," RSC Advances, vol. 5, Issue 62, May 26, 2015, The Royal Society of Chemistry, pp. 1-6.
Kiani, M.A. et al., "Size effect investigation on battery performance: Comparison between micro- and nano-particles of $3-Ni(OH)_2$ as nickel battery cathode material," Journal of Power Sources, vol. 195, Issue 17, Apr. 2, 2010, Elsevier B.V., pp. 5794-5800.
Kiani, M.A. et al., "Synthesis of Nano- and Micro-Particles of $LiMn_2O_4$: Electrochemical Investigation and Assessment as a Cathode in Li Battery," International Journal of Electrochemical Science, vol. 6, Issue 7, Jul. 1, 2011, ESG, pp. 2581-2595.
Kovtyukhova, Nina, I. et al., "Layer-by-Layer Assembly of Ultrathin Composite Films from Micron-Sized Graphite Oxide Sheets and Polycations," Kovtyukhova, et al, Chemistry of Materials, vol. 11, Issue 3, Jan. 28, 1999, American Chemical Society, pp. 771-778.
Lam, L.T. et al., "Development of ultra-battery for hybrid-electric vehicle applications," Journal of Power Sources, vol. 158, Issue 2, May 2, 2006, Elsevier B.V., pp. 1140-1148.
Lang, Xingyou et al., "Nanoporous metal/oxide hybrid electrodes for electrochemical supercapacitors," Nature Nanotechnology, vol. 6, Apr. 2011, Macmillan Publishers Limited, pp. 232-236.
Lee, Kyu Hyung et al., "Large scale production of highly conductive reduced graphene oxide sheets by a solvent-free low temperature reduction," Carbon, vol. 69, Dec. 16, 2013, Elsevier Ltd., pp. 327-335.
Lee, Kyoung, G. et al, "Sonochemical-assisted synthesis of 3D graphene/nanoparticle foams and their application in supercapacitor," Ultrasonics Sonochemistry, vol. 22, May 2, 2014, Elsevier B.V., pp. 422-428.
Lee, Seung Woo et al., "Carbon Nanotube/Manganese Oxide Ultrathin Film Electrodes for Electrochemical Capacitors," ACS Nano, vol. 4, Issue 7, Jun. 16, 2010, American Chemical Society, pp. 3889-3896.
Lei, Zhibin et al., "Platelet CMK-5 as an Excellent Mesoporous Carbon to Enhance the Pseudocapacitance of Polyaniline," ACS Applied Materials & Interfaces, vol. 5, Issue 15, Jul. 12, 2013, American Chemical Society, pp. 7501-7508.
Li, Dan et al., "Processable aqueous dispersions of graphene nanosheets," Nature Nanotechnology, vol. 3, Feb. 2008, Nature Publishing Group, pp. 101-105.
Li, Lei et al., "Nanocomposite of Polyaniline Nanorods Grown on Graphene Nanoribbons for Highly Capacitive Pseudocapacitors," ACS Applied Materials and Interfaces, vol. 5, Issue 14, Jun. 21, 2013, American Chemical Society, 6 pages.
Li, Peixu et al., "Core-Double-Shell, Carbon Nanotube@Polypyrrole@$MnO_2$ Sponge as Freestanding, Compressible Supercapacitor Electrode," ACS Applied Materials and Interfaces, vol. 6, Issue 7, Mar. 12, 2014, American Chemical Society, pp. 5228-5234.
Li, Qi et al., "Design and Synthesis of $MnO_2$/Mn/$MnO_2$ Sandwich-Structured Nanotube Arrays with High Supercapacitive Performance for Electrochemical Energy Storage," Nano Letters, vol. 12, Issue 7, Jun. 25, 2012, American Chemical Society, pp. 3803-3807.
Li, Yingzhi et al., "Oriented Arrays of Polyaniline Nanorods Grown on Graphite Nanosheets for an Electrochemical Supercapacitor," Langmuir, vol. 29, Issue 1, Dec. 3, 2012, American Chemical Society, 8 pages.
Li, Zhe-Fei et al., "Fabrication of high-surface-area graphene/polyaniline nanocomposites and their application in supercapaci-

(56) References Cited

OTHER PUBLICATIONS tors," ACS Applied Materials & Interfaces, vol. 5, Issue 7, Mar. 12, 2013, American Chemical Society, pp. 1-25.
Lin, Jian et al., "3-Dimensional Graphene Carbon Nanotube Carpet-Based Microsupercapacitors with High Electrochemical Performance," Nano Letters, vol. 13, Issue 1, Dec. 13, 2012, American Chemical Society, pp. 72-78.
Linden, David et al., "Handbook of Batteries," McGraw-Hill Handbooks, Third Edition, 2010, New York, The McGraw-Hill Companies, Inc., 1,454 pages.
Liu, Wenwen et al., "Novel and high-performance asymmetric micro-supercapacitors based on graphene quantum dots and polyaniline nanofibers," Nanoscale, vol. 5, Apr. 24, 2013, The Royal Society of Chemistry, pp. 6053-6062.
Liu, Wen-Wen et al., "Superior Micro-Supercapacitors Based on Graphene Quantum Dots," Advanced Functional Materials, vol. 23, Issue 33, Mar. 26, 2013, WILEY-VCH Verlag GmbH & Co. KGaA, Weinheim, pp. 4111-4122.
Liu, Yongfeng et al., "Advanced hydrogen storage alloys for Ni/MH rechargeable batteries," Journal of Materials Chemistry, vol. 21, Issue 11, Dec. 15, 2010, The Royal Society of Chemistry, pp. 4743-4755.
Long, Jeffrey W. et al., "Asymmetric electrochemical capacitors—Stretching the limits of aqueous electrolytes," MRS Bulletin, vol. 36, Jul. 2011, Materials Research Society, pp. 513-522.
Lu, Xihong et al., "Stabilized TiN Nanowire Arrays for High-Performance and Flexible Supercapacitors," Nano Letters, vol. 12, Issue 10, Sep. 4, 2012, American Chemical Society, 6 pages.
Lukatskaya, Maria R. et al., "Cation Intercalation and High Volumetric Capacitance of Two-Dimensional Titanium Carbide," Science, vol. 341, Issue 6153, Sep. 27, 2013, American Association for the Advancement of Science, pp. 1502-1505.
Lukic, Srdjam, M. et al., "Power Management of an Ultracapacitor/Battery Hybrid Energy Storage System in an HEV," IEEE Vehicle Power and Propulsion Conference (VPPC), Sep. 6-8, 2006, IEEE, 6 pages.
Office Action for Canadian Patent Application No. 2,862,806, dated Sep. 30, 2019, 3 pages.
Decision of Rejection for Japanese Patent Application No. 2016-573846, dated Oct. 29, 2019, 9 pages.
First Office Action for Chinese Patent Application No. 2016800753323, dated Aug. 27, 2019, 15 pages.
Extended European Search Report for European Patent Application No. 17741923.1, dated Nov. 15, 2019, 18 pages.
Extended European Search Report for European Patent Application No. 17776536.9, dated Oct. 30, 2019, 8 pages.
Extended European Search Report for European Patent Application No. 17771081.1, dated Oct. 22, 2019, 6 pages.
Fernandez-Merino, M.J. et al., "Vitamin C is an Ideal Substitute for Hydrazine in the Reduction of Graphene Oxide Suspensions," The Journal of Physical Chemistry C, vol. 114, No. 14, Mar. 4, 2010, American Chemical Society, pp. 6426-6432.
Lu, J. et al., "Advanced applications of ionic liquids in polymer science," Progress in Polymer Science, vol. 34, 2009, Elsevier Ltd., pp. 431-448.
Yan, Jun et al., "High-performance supercapacitor electrodes based on highly corrugated graphene sheets," Carbon, vol. 50, 2012, Elsevier Ltd., pp. 2179-2188.
Final Office Action for U.S. Appl. No. 16/029,930, dated Nov. 15, 2019, 16 pages.
Notice of Allowance and Examiner-Initiated Interview Summary for U.S. Appl. No. 15/410,404, dated Oct. 25, 2019, 11 pages.
Final Office Action for U.S. Appl. No. 15/688,342, dated Oct. 17, 2019, 11 pages.
Non-Final Office Action for U.S. Appl. No. 15/630,758, dated Oct. 11, 2019, 11 pages.
Applicant-Initiated Interview Summary for U.S. Appl. No. 15/466,425, dated Oct. 22, 2019, 3 pages.
Notice of Allowance for U.S. Appl. No. 15/319,286, dated Oct. 1, 2018, 8 pages.
Corrected Notice of Allowability for U.S. Appl. No. 15/319,286, dated Oct. 29, 2018, 5 pages.
Corrected Notice of Allowability for U.S. Appl. No. 15/319,286, dated Nov. 30, 2018, 5 pages.
Corrected Notice of Allowability for U.S. Appl. No. 15/319,286, dated Jan. 18, 2019, 5 pages.
Notification of the First Office Action for Chinese Patent Application No. 201580043429.1, dated Oct. 29, 2018, 19 pages.
Advisory Action for U.S. Appl. No. 14/945,232, dated Oct. 15, 2018, 3 pages.
Non-Final Office Action for U.S. Appl. No. 14/945,232, dated Jan. 9, 2019, 7 pages.
Extended European Search Report for European Patent Application No. 15861794.4, dated Oct. 2, 2018, 13 pages.
Final Office Action for U.S. Appl. No. 15/382,871, dated Jan. 25, 2019, 16 pages.
Non-Final Office Action for U.S. Appl. No. 15/410,404, dated Sep. 27, 2018, 9 pages.
Final Office Action for U.S. Appl. No. 15/472,409, dated Jan. 18, 2019, 12 pages.
International Preliminary Report on Patentability for International Patent Application No. PCT/US2017/024716, dated Oct. 11, 2018, 10 pages.
International Preliminary Report on Patentability for International Patent Application No. PCT/US2017/038992, dated Jan. 3, 2019, 10 pages.
International Preliminary Report on Patentability for International Patent Application No. PCT/US2017/023632, dated Oct. 4, 2018, 8 pages.
Invitation to Pay Additional Fees for International Patent Application No. PCT/US2018/041728, dated Sep. 12, 2018, 2 pages.
International Search Report and Written Opinion for International Patent Application No. PCT/US2018/041728, dated Nov. 9, 2018, 10 pages.
Notice of Reasons for Rejection for Japanese Patent Application No. 2014-561017, dated Mar. 21, 2017, 10 pages.
International Search Report and Written Opinion for PCT/US2013/029022, dated Jun. 26, 2013, 13 pages.
International Preliminary Report on Patentability for PCT/US2013/029022 dated Sep. 18, 2014, 9 pages.
International Search Report and Written Opinion for International Patent Application No. PCT/US2015/036082, dated Aug. 27, 2015, 15 pages.
International Preliminary Report on Patentability for International Patent Application No. PCT/US2015/036082, dated Dec. 29, 2016, 12 pages.
International Search Report and Written Opinion for International Patent Application No. PCT/US2015/061400, dated Mar. 29, 2016, 20 pages.
Invitation to Pay Additional Fees for International Patent Application No. PCT/US2016/067468, dated Feb. 13, 2017, 2 pages.
Conway, B. E., "Chapter 2: Similarities and Differences between Supercapacitors and Batteries for Storing Electrical Energy," Electrochemical Supercapacitors: Scientific Fundamentals and Technological Applications (book), 1999, New York, Springer Science + Business Media, pp. 11-12.
Conway, B. E., "Chapter 3: Energetics and Elements of the Kinetics of Electrode Processes," Electrochemical Supercapacitors: Scientific Fundamentals and Technological Applications (book), 1999, New York, Springer Science + Business Media, pp. 33-34.
Ozawa, Kazunori, "Lithium-Cell System—Nonaqueous Electrolyte System," Lithium Ion Rechargeable Batteries (book), Chapter 1: General Concepts, Section 1.1.2, 2009, WILEY-VCH Verlag GmbH & Co. KGaA, 5 pages.
Root, Michael, "Electric Vehicles," The TAB™ Battery Book: An In-Depth Guide to Construction, Design, and Use (book), Chapter 2: The Many Uses of Batteries, 2011, The McGraw-Hill Companies, 4 pages.
Kaewsongpol, Tanon et al., "High-performance supercapacitor of electrodeposited porous 3Dpolyaniline nanorods on functionalized carbon fiber paper: Effects of hydrophobic and hydrophilic surfaces of conductive carbon paper substrates," Materials Today Communications, vol. 4, Aug. 19, 2015, Elsevier Ltd., pp. 176-185.

(56) References Cited

OTHER PUBLICATIONS

Yan, Jun et al., "Preparation of graphene nanosheet/carbon nanotube/polyaniline composite as electrode material for supercapacitors," Journal of Power Sources, vol. 195, Issue 9, Nov. 11, 2009, Elsevier B.V., pp. 3041-3045.
Non-Final Office Action for U.S. Appl. No. 13/725,073, dated Aug. 28, 2017, 41 pages.
Fourth Office Action for Chinese Patent Application No. 201280070343.4, dated Apr. 26, 2017, 22 pages.
Examination Report for European Patent Application No. 12874989.2, dated Jul. 24, 2017, 5 pages.
Notice of Reason for Rejection for Japanese Patent Application No. 2014-548972, dated May 23, 2017, 4 pages.
Second Office Action for Chinese Patent Application No. 201380023699.7, dated Aug. 9, 2017, 8 pages.
Communication pursuant to Article 94(3) EPC for European Patent Application No. 13757195.6, dated Jul. 6, 2017, 3 pages.
International Preliminary Report on Patentability for International Patent Application No. PCT/US2015/061400, dated Jun. 1, 2017, 16 pages.
International Search Report and Written Opinion for International Patent Application No. PCT/US2016/067468, dated Apr. 21, 2017, 10 pages.
International Search Report and Written Opinion for International Patent Application No. PCT/US2017/014126, dated Apr. 20, 2017, 13 pages.
International Search Report and Written Opinion for International Patent Application No. PCT/US2017/024716, dated Jun. 20, 2017, 13 pages.
International Search Report and Written Opinion for International Patent Application No. PCT/US2017/023632, dated May 31, 2017, 11 pages.
International Search Report and Written Opinion for International Patent Application No. PCT/US2017/038992, dated Sep. 21, 2017, 12 pages.
Invitation to Pay Additional Fees for International Patent Application No. PCT/US2017/048883, dated Sep. 29, 2017, 2 pages.
International Search Report and Written Opinion for International Patent Application No. PCT/US2017/048883, dated Dec. 26, 2017, 10 pages.
Non-Final Office Action for U.S. Appl. No. 14/945,232, dated Jan. 29, 2018, 9 pages.
Extended European Search Report for European Patent Application No. 15809519.0, dated Feb. 5, 2018, 10 pages.
Decision on Rejection for Chinese Patent Application No. 201280070343.4, dated Jan. 5, 2018, 18 pages.
Non-Final Office Action for U.S. Appl. No. 15/612,405, dated Feb. 9, 2018, 9 pages.
Decision to Grant a Patent for Japanese Patent Application No. 2014-561017, dated Mar. 13, 2018, 4 pages.
Final Office Action for U.S. Appl. No. 13/725,073, dated Apr. 6, 2018, 37 pages.
Notice of Allowance for U.S. Appl. No. 15/612,405, dated May 16, 2018, 8 pages.
Third Office Action and Search Report for Chinese Patent Application No. 201380023699.7, dated Mar. 9, 2018, 16 pages.
Examination Report for European Patent Application No. 13757195.6, dated Jun. 13, 2018, 7 pages.
Non-Final Office Action for U.S. Appl. No. 15/319,286, dated Jun. 27, 2018, 9 pages.
Final Office Action for U.S. Appl. No. 14/945,232, dated Aug. 10, 2018, 7 pages.
Notification of the First Office Action for Chinese Patent Application No. 201580072540.3, dated Jun. 25, 2018, 14 pages.
Partial Supplementary European Search Report for European Patent Application No. 15861794.4, dated Jun. 28, 2018, 16 pages.
Non-Final Office Action for U.S. Appl. No. 15/382,871, dated Jun. 27, 2018, 11 pages.
International Preliminary Report on Patentability for International Patent Application No. PCT/US2016/067468, dated Jul. 5, 2018, 7 pages.
International Preliminary Report on Patentability for International Patent Application No. PCT/US2017/014126, dated Aug. 2, 2018, 10 pages.
Non-Final Office Action for U.S. Appl. No. 15/472,409, dated Jun. 29, 2018, 11 pages.
Decision on Rejection for Chinese Patent Application No. 201380023699.7, dated Aug. 16, 2018, 11 pages.
Braz, Elton P., et al., "Effects of Gamma Irradiation in Graphene/Poly(ethylene Oxide) Nanocomposites," 2013 International Nuclear Atlantic Conference—INAC 2013, Nov. 24-29, 2013, Recife, PE, Brazil, 7 pages.
Hu, Liangbing, et al., "Lithium-Ion Textile Batteries with Large Areal Mass Loading," Advanced Energy Materials, vol. 1, Issue 6, Oct. 6, 2011, pp. 1012-1017.
First Office Action for Canadian Patent Application No. 2,862,806, dated Nov. 22, 2018, 5 pages.
Non-Final Office Action for U.S. Appl. No. 16/029,930, dated Jan. 14, 2019, 8 pages.
Office Action for Canadian Patent Application No. 2,866,250, dated Jan. 11, 2019, 3 pages.
Advisory Action for U.S. Appl. No. 15/612,405, dated Jun. 24, 2020, 3 pages.
Non-Final Office Action for U.S. Appl. No. 16/029,930, dated Jun. 24, 2020, 16 pages.
First Office Action and Search Report for Chinese Patent Application No. 201811438766.2, dated Mar. 31, 2020, 32 pages.
Office Action for Vietnamese Patent Application No. 1-2016-05086, dated May 29, 2020, 2 pages.
Final Office Action for U.S. Appl. No. 16/428,409, dated Jun. 23, 2020, 16 pages.
Non-Final Office Action for U.S. Appl. No. 15/466,425, dated Jul. 28, 2020, 8 pages.
Notice of Allowance for U.S. Appl. No. 16/692,123, dated Jul. 15, 2020, 9 pages.
Advisory Action for U.S. Appl. No. 15/466,425, dated Jul. 7, 2020, 3 pages.
Examination Report for Indian Patent Application No. 201817034180, dated Aug. 13, 2020, 6 pages.
Examination Report for European Patent Application No. 17816292.1, dated Aug. 24, 2020, 4 pages.
Examination Report for Indian Patent Application No. 201817033309, dated Aug. 28, 2020, 6 pages.
Official Notification for Eurasian Patent Application No. 201990068, dated Jun. 23, 2020, 5 pages.
Official Action for Eurasian Patent Application No. 201791078, dated Jun. 23, 2020, 4 pages.
Examination Report for Indian Patent Application No. 201717016755, dated Jul. 2, 2020, 6 pages.
Examination Report for Indian Patent Application No. 201817020826, dated Jul. 13, 2020, 7 pages.
Extended European Search Report for European Patent Application No. 17847303.9, dated Jul. 13, 2020, 9 pages.
First Office Action and Search Report for Chinese Patent Application No. 2017800273161, dated Jun. 5, 2020, 15 pages.
Notice of Allowance for U.S. Appl. No. 15/612,405, dated Sep. 8, 2020, 7 pages.

* cited by examiner

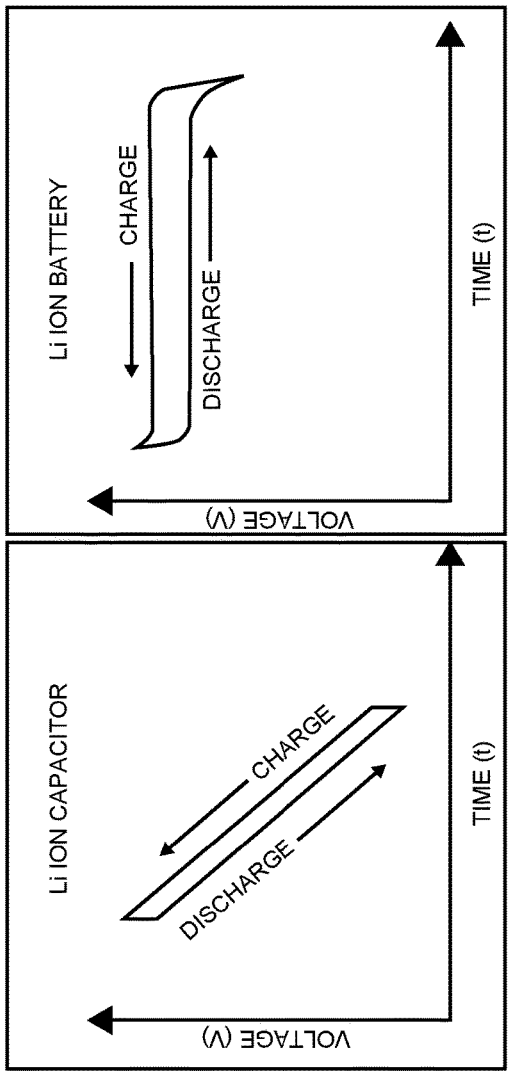
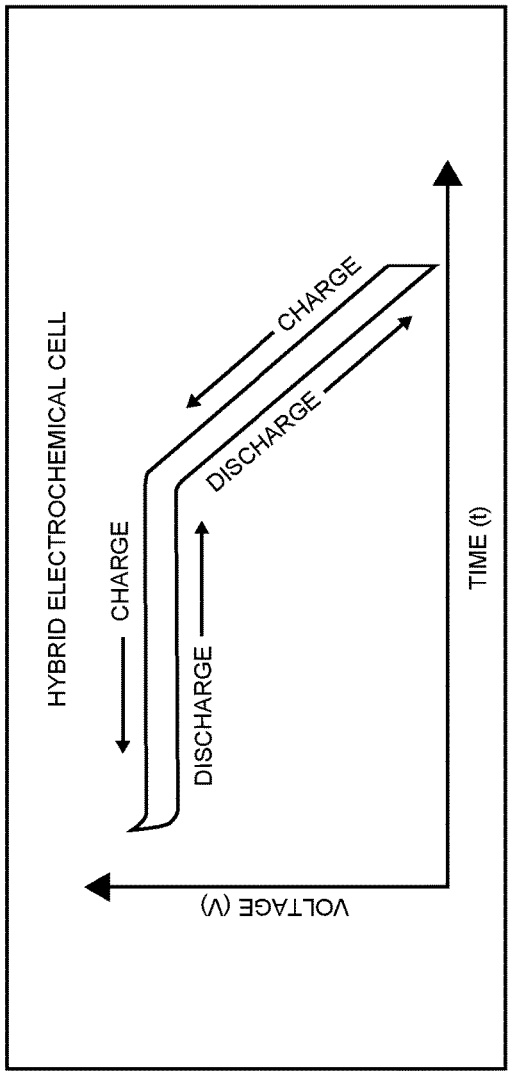
FIG. 8A (PRIOR ART)
FIG. 8B (PRIOR ART)
FIG. 8C

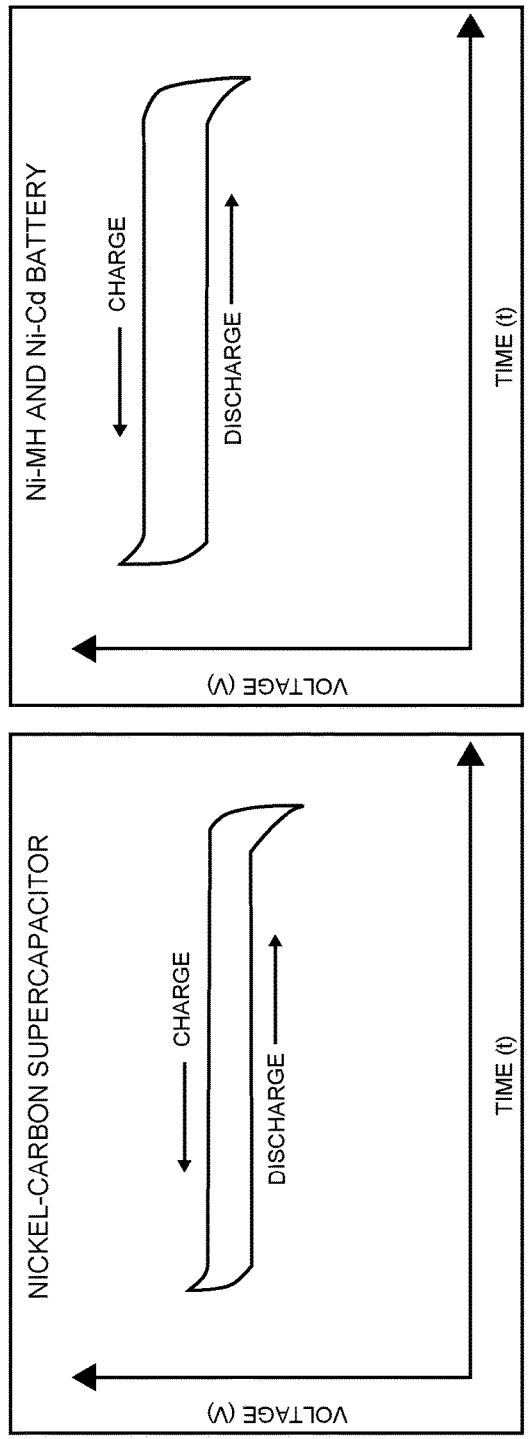
FIG. 10A (PRIOR ART)
FIG. 10B (PRIOR ART)
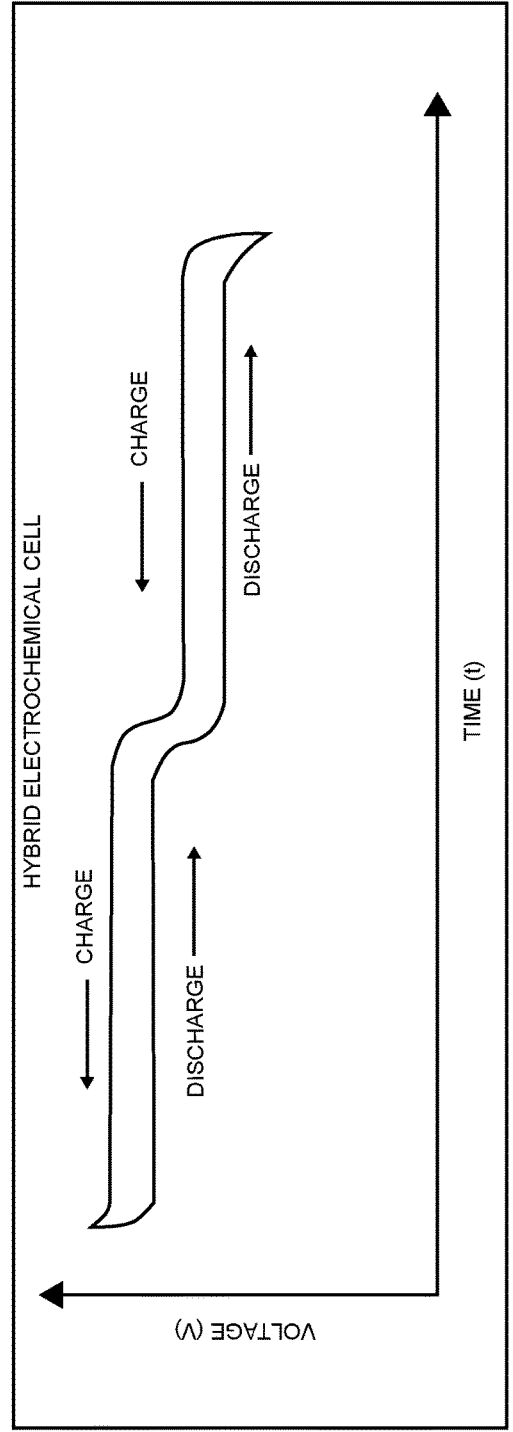
FIG. 10C

HYBRID ELECTROCHEMICAL CELL

PRIORITY

This application is a divisional of U.S. patent application Ser. No. 15/319,286, filed Dec. 15, 2016, now U.S. Pat. No. 10,211,495, which is a 35 USC 371 National Phase filing of International application No. PCT/US15/36082, filed Jun. 16, 2015, which claims the benefit of U.S. provisional patent application No. 62/012,835, filed Jun. 16, 2014, the disclosures of which are incorporated herein by reference in their entireties.

GOVERNMENT SUPPORT

This research was supported in part by the Ministry of Higher Education of Egypt through a graduate research fellowship—the Missions Program.

FIELD OF THE DISCLOSURE

The disclosure relates to electrochemical cells and in particular to a hybrid electrochemical cell having an energy density typical of a battery and a power density typical of a supercapacitor.

BACKGROUND

Batteries are used to power portable electronics such as smartphones, tablets, and laptop computers. Batteries have affected various aspects of modern living. There are numerous applications for batteries. Moreover, batteries are integral for renewable energy production from sun and wind as well as the development of electric and hybrid electric vehicles. Batteries store a large amount of charge through electrochemical reactions and typically take hours to recharge. What is needed is a hybrid electro-chemical cell that is quickly rechargeable like a supercapacitor and that stores a large amount of charge like a battery.

SUMMARY

A hybrid electrochemical cell having a first conductor with at least one portion that is both a first capacitor electrode and a first battery electrode is disclosed. The hybrid electrochemical cell further includes a second conductor having at least one portion that is a second capacitor electrode and at least one other portion that is a second battery electrode. An electrolyte is in contact with both the first conductor and the second conductor.

In some embodiments, the hybrid electrochemical cell further includes a separator between the first conductor and the second conductor to prevent physical contact between the first conductor and the second conductor, while facilitating ion transport between the first conductor and the second conductor. Moreover, at least one exemplary embodiment of the hybrid electrochemical cell relies on lithium-ion (Li-Ion) chemistry. Other exemplary embodiments of the hybrid electrochemical cell are based upon nickel-cadmium (Ni—Cd) and nickel-metal hydride (Ni-MH) chemistries. Further still, some embodiments of the hybrid electrochemical cell are sized to power electric vehicles for transportation, while other embodiments are sized small enough to power implantable medical devices.

Generally described herein, in certain embodiments, is an energy storage technology comprising a supercapacitor designed to store charge on the surface of large surface area materials. In some applications, the disclosed supercapacitor captures and releases energy in seconds and can do so through millions of cycles. Further described herein is an improvement that provides greater charge storage capacity using, for example, power systems that combine supercapacitors and batteries that provide for a high charge storage capacity of batteries and the quick recharge of supercapacitors. Indeed, the inventors have identified, and have described methods, devices, and systems that solve several long-felt and unmet needs for devices that include electrochemical energy storage having relatively fast energy recharge times in contrast to batteries with relatively slow recharge times that limit mobility of a user.

In certain aspects, described herein are power systems, methods, and devices based upon combinations of supercapacitors and batteries for various applications, including by way of non-limiting examples electric and hybrid electric vehicles. For example, electric vehicles are often powered by one of the following energy storage systems: fuel cells, batteries, or supercapacitors. However, installing only one type of conventional energy storage is often insufficient.

In addition, the running cost of the normally available supercapacitor and battery-based power systems is expensive and they are relatively bulky in size. As a result, such power systems are not usable in a practical manner with portable electronics, such as smartphones, tablets, and implantable medical devices.

Advantages of the subject matter described herein are robust and numerous. For example, one advantage of the subject matter described herein is a hybrid electrochemical cell that provides the high energy density of a battery with the high power density of a supercapacitor. In some embodiments, the hybrid electrochemical cells provided herein do not require an electronic converter and/or bulky packaging. As another example, the subject matter described herein provides a hybrid electrochemical cell that combines a supercapacitor and battery that does not necessarily require wiring a battery to a supercapacitor in parallel, nor does it necessarily require expensive electronic converters that are required to control power flow between the battery and supercapacitor.

In one aspect, described herein are methods, devices, and systems that provide for a hybrid electrochemical cell with a first conductor having a single portion that is both a first capacitor electrode and a first battery electrode. For example, the hybrid electrochemical cell further includes a second conductor having at least one portion that is a second capacitor electrode and at least one other portion that is a second battery electrode. In certain applications, an electrolyte is in contact with both the first conductor and the second conductor.

In some embodiments, the hybrid electrochemical cell further includes a separator between the first conductor and the second conductor to prevent physical contact between the first conductor and the second conductor, while still facilitating ion transport between the first conductor and the second conductor. Moreover, at least one exemplary embodiment of the hybrid electrochemical cell relies on lithium-ion (Li-Ion) chemistry. Other exemplary embodiments of the hybrid electrochemical cell are based upon nickel-cadmium (Ni—Cd) and/or nickel-metal hydride (Ni-MH) chemistries. Further still, some embodiments of the hybrid electrochemical cell are sized to power electric vehicles for transportation, while other embodiments are sized small enough to power implantable medical devices.

In one aspect, provided herein are methods, devices, and systems comprising a hybrid electrochemical cell comprising: (a) a first conductor having at least a one portion that is both a first capacitor electrode and a first battery electrode; (b) a second conductor having at least one portion that is a second capacitor electrode and at least one other portion that is a second battery electrode; and (c) an electrolyte in contact with both the first conductor and the second conductor. In some embodiments, provided herein is a method, device, and system that comprises a hybrid electrochemical cell that contains a separator between the first conductor and the second conductor that is configured in a manner to prevent or reduce physical contact between the first conductor and the second conductor and that facilitates ion transport between the first conductor and the second conductor. In some embodiments, the hybrid electrochemical cell comprises lithium-ion (Li-Ion) chemistry. In further or additional embodiments, the first conductor of the hybrid electrochemical cell is negative and is doped with lithium ions. In certain embodiments, the hybrid electrochemical cell comprises a first conductor that comprises a graphite negative electrode. In some embodiments, a first negative battery electrode comprises: hard carbon, silicon alloy, and/or composite alloy. In certain embodiments, the second battery electrode comprises a layered metal oxide positive electrode, and the second capacitor electrode comprises an activated carbon positive electrode. In some embodiments, provided is a hybrid electrochemical cell wherein the second positive battery electrode comprises: lithium cobalt oxide, lithium manganese oxide, lithium nickel oxide, lithium nickel manganese cobalt oxide, lithium nickel cobalt aluminum oxide, lithium titanium oxide, or lithium iron phosphate. In certain applications, the second capacitor electrode and the second battery electrode are delineated. In some embodiments, the second capacitor electrode and the second battery electrode are connected internally in parallel on one cell, and wherein the capacitor electrode acts as a buffer to prevent or reduce high rate charge and discharge of the battery. In some embodiments, the ratio between the portion of the second capacitor electrode and the second battery electrode is about 1:1. In some applications, the ratio between the portion of the second capacitor electrode and the second battery electrode is within the range of from about 1:10 to about 10:1. In still further or additional embodiments, a desirable power density of the hybrid electrochemical cell is achieved with an increase of a ratio between the portion of the second capacitor electrode and the second battery electrode. In yet further or additional embodiments, an energy density of the hybrid electrochemical cell is achieved with a decrease of the ratio between the portion of the second capacitor electrode and the second battery electrode. In still further or additional embodiments, the second capacitor electrode comprises an electric double layer capacitor (EDLC) in which charge is stored in the double layers. In some of these additional embodiments, the second capacitor electrode comprises activated carbon.

In another aspect, described herein are methods, devices, and systems that provide for a hybrid electrochemical cell comprising: (a) a first conductor having at least a one portion that is both a first capacitor electrode and a first battery electrode; (b) a second conductor having at least one portion that is a second capacitor electrode and at least one other portion that is a second battery electrode; and (c) an electrolyte in contact with both the first conductor and the second conductor, provided that at least one second capacitor electrode comprises an electric double layer capacitor (EDLC) in which charge is stored in the double layers. In some of these additional embodiments, the second capacitor electrode comprises an interconnected corrugated carbon-based network (ICCN). In certain embodiments, the interconnected corrugated carbon-based network (ICCN) electrode comprises a plurality of expanded and interconnected carbon layers that include a corrugated carbon layer. In some embodiments, each expanded and/or interconnected carbon layer comprises at least one corrugated carbon sheet that is about one atom thick. In some embodiments, each expanded and interconnected carbon layer comprises a plurality of corrugated carbon sheets. In further or additional embodiments, the thickness of the ICCN, as measured from cross-sectional scanning electron microscopy (SEM) and profilometry, is around about 7 or about 8 µm. In some embodiments, a range of thicknesses of the plurality of expanded and interconnected carbon layers making up the ICCN is from around about 5 µm to 100 µm. In further or additional embodiments, the second capacitor electrode is redox active to store charge via intercalation pseudo-capacitance. In some of these embodiments, the second capacitor electrode comprises niobium pentoxide ($Nb_2O_5$).

In another aspect, described herein are methods, devices, and systems comprising a hybrid electrochemical cell comprising: (a) a first conductor having at least a one portion that is both a first capacitor electrode and a first battery electrode; (b) a second conductor having at least one portion that is a second capacitor electrode and at least one other portion that is a second battery electrode; and (c) an electrolyte in contact with both the first conductor and the second conductor, provided that the hybrid electrochemical cell is integrated on a micro-scale. In certain applications, the micro-hybrid electrochemical cell is flexible in size and shape. In some embodiments, the micro-hybrid electrochemical cell is integrated into an implantable medical device, a smart card, a radio frequency identification (RFID) tag, a wireless sensor, or a wearable electronic. In further or additional embodiments, the micro-hybrid electrochemical cell is incorporated into a self-powered system. In some applications, the micro-hybrid electrochemical cell is fabricated on the backside of a solar cell of a device. In some embodiments, the second capacitor electrode and the second battery electrode each has an electrode digit with a length L, a width W, and an interspace I. In certain embodiments, a length L is about 4000 µm to about 5000 µm, a width is about 300 µm to around about 1800 µm, and a interspace I is about 100 µm to about 200 µm. In further or additional embodiments, a miniaturization of the width W of the electrode digits and the interspace I between the electrode digits in the micro-hybrid electrochemical cell reduces ionic diffusion pathways.

In yet another aspect, provided herein are methods, devices, and systems comprising a hybrid electrochemical cell comprising: (a) a first conductor having at least a one portion that is both a first capacitor electrode and a first battery electrode; (b) a second conductor having at least one portion that is a second capacitor electrode and at least one other portion that is a second battery electrode; and (c) an electrolyte in contact with both the first conductor and the second conductor, provided that the hybrid electrochemical cell relies on or comprises nickel-cadmium (Ni—Cd) and/or nickel-metal hydride (Ni-MH) chemistries. In certain embodiments, the first conductor is positive and includes nickel oxyhydroxide (NiOOH) that reduces to nickel hydroxide ($Ni(OH)_2$) during discharge. In further or additional embodiments, the second capacitor electrode and the second battery electrode are positive electrodes. In some embodiments, the second capacitor electrode and the second battery electrode are delineated. In still further or additional embodiments, the ratio between the portion of the second capacitor electrode and the second battery electrode is about 1:1. In some embodiments, the ratio between the portion of the second capacitor electrode and the second battery electrode is from about 1:10 to about 10:1. In some embodiments, a power density of the hybrid electrochemical cell is achieved with an increase of a ratio between the portion of the second capacitor electrode and the second battery electrode. In certain applications, an energy density of the hybrid electrochemical cell is achieved with a decrease of the ratio between the portion of the second capacitor electrode and the second battery electrode. In some applications, the hybrid electrochemical cell is flexible in size and shape. In some embodiments, the second capacitor electrode and the second battery electrode each has an electrode digit with a length L, a width W, and an interspace I. In certain embodiments, the length L is around about 4000 µm to about 5000 µm, the width W ranges from around about 300 µm to about 1800 µm, and the interspace I ranges from about 100 µm to about 200 µm. In some embodiments, a miniaturization of the width W of the electrode digits and the interspace I between the electrode digits in the micro-hybrid electrochemical cell reduces ionic diffusion pathways.

In another aspect, provided is a method of manufacturing a hybrid electrochemical cell, the method comprising providing a first conductor, a second conductor and an electrolyte, wherein: (a) the first conductor has a single portion that is both a first capacitor electrode and a first battery electrode; (b) the second conductor has at least one portion that is a second capacitor electrode and at least one other portion that is a second battery electrode; and (c) the electrolyte is in contact with both the first conductor and the second conductor.

In another aspect, provided is a method of manufacturing a micro-hybrid electrochemical cell comprising lithium-ion (Li-Ion) material, the method comprising growing porous positive and negative electrode materials on ICCN interdigitated patterns, wherein the ICCN pattern is created using a consumer-grade optical disc burner drive, comprising a series of steps of: (a) a first step, wherein a graphite oxide (GO) dispersion in water is dropcast onto an optical disc and dried in air to form a graphite film; (b) a second step, wherein a micro-pattern made with imaging or drafting software is directly printed onto the GO-coated optical disc, and wherein the GO film absorbs the energy from a laser and is converted into an ICCN pattern; (c) a third step, wherein anode and cathode materials are sequentially electrodeposited on the ICCN scaffold, and voltage-controlled and current-controlled electrodeposition is used to ensure conformal coating of the active materials throughout the three-dimensional (3D) structure of the ICCN; (d) a fourth step, wherein a nickel-tin alloy, silicon, or graphite micro-particles are electrodeposited onto ICCN corresponding to the anode; and (e) a fifth step, wherein a drop of electrolyte is added to provide ions that allow continuous electron flow when the micro-hybrid electrochemical cell is under load.

Another aspect of the subject matter described herein provides for a method of manufacturing a micro-hybrid electrochemical cell relying on Ni—Cd and/or Ni-MH chemistries, the method comprising growing porous positive and negative electrode materials on ICCN interdigitated patterns, wherein the ICCN pattern is created using an optical disc burner drive, comprising a series of steps of: (a) a first step, wherein a graphite oxide (GO) dispersion in water is dropcast onto an optical disc and dried in air to form a graphite film; (b) a second step, wherein a micro-pattern made with imaging or drafting software is directly printed onto the GO-coated optical disc, and wherein the GO film absorbs the energy from a laser and is converted into an ICCN pattern; (c) a third step, wherein voltage-controlled and current-controlled electrodeposition is used to ensure conformal coating of the active materials throughout the 3D structure of ICCN, and a metal such as lanthanum nickel ($LaNi_5$) or palladium (Pd) is electrodeposited on ICCN microelectrodes making up the second battery electrode that forms a portion of an anode; (d) a fourth step, wherein cadmium hydroxide ($Cd(OH)_2$) is added to the ICCN corresponding to the anode; and (e) a fifth step, wherein a drop of electrolyte is added to provide ions that allow continuous electron flow when the micro-hybrid electrochemical cell is under load.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description, serve to explain the principles of the disclosure.

FIG. 8A is a charge-discharge graph of voltage versus time for a prior art Li-Ion capacitor.

FIG. 8B is a charge-discharge graph of voltage versus time for a prior art Li-Ion battery.

FIG. 8C is a non-limiting, illustrative depiction of a charge-discharge graph of an embodiment of a voltage versus time for a hybrid electrochemical cell of the present disclosure.

FIG. 10A is a graph depicting a charge-discharge curve for a prior art nickel-carbon supercapacitor.

FIG. 10B is a graph depicting a charge-discharge curve for both a prior art Ni—Cd battery and a prior art Ni-MH battery.

FIG. 10C is a non-limiting, illustrative depiction of a charge-discharge graph of voltage versus time for embodiments of either of the Ni—Cd and the Ni-MH chemistries comprising hybrid electrochemical cells of the present disclosure.

DETAILED DESCRIPTION

Upon reading the following description in light of the accompanying drawings, those skilled in the art will understand the concepts of the disclosure and will recognize applications of these concepts not particularly addressed herein. It should be understood that these concepts and applications are non-limiting and fall within the scope of the disclosure and the accompanying claims.

Figure 1:
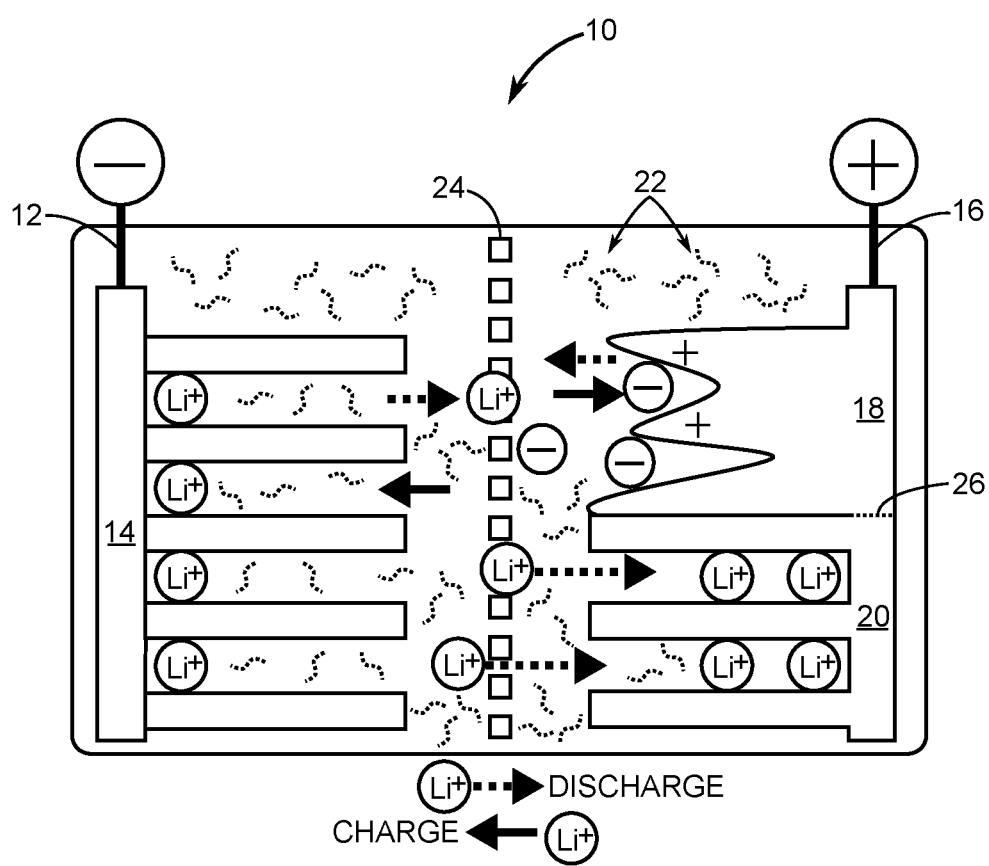
FIG. 1 is a diagram of a non-limiting, illustrative depiction of a lithium ion (Li-Ion) based hybrid electrochemical cell in accordance with the present disclosure.

A feature of the subject matter described herein is a hybrid electrochemical cell. In certain embodiments, the hybrid electrochemical cells described herein comprise nickel-cadmium (Ni—Cd), nickel-metal hydride (Ni-MH) and/or lithium-ion (Li-Ion) batteries. FIG. 1, for example, depicts a non-limiting structure of a Li-Ion based hybrid electrochemical cell 10 in accordance with the present disclosure. The hybrid electrochemical cell 10 includes a first conductor 12 having a single portion 14 that is both a first capacitor electrode and a first battery electrode. In the Li-Ion based chemistry of the hybrid electrochemical cell 10, the first conductor 12 is negative and is doped with lithium ions. The hybrid electrochemical cell 10 includes a second conductor 16 having at least one portion that is a second capacitor electrode 18 and at least one other portion that is a second battery electrode 20. An electrolyte 22 is in contact with both the first conductor 12 and the second conductor 16. A separator 24 between the first conductor 12 and the second conductor 16 prevents physical contact between the first conductor 12 and the second conductor 16, while facilitating ion transport between the first conductor 12 and the second conductor 16. The second capacitor electrode 18 and the second battery electrode 20 are delineated by a horizontal dashed line 26 in FIG. 1. As shown, a ratio between the portion of the second capacitor electrode 18 and the second battery electrode 20 is about 1:1. However, it is to be understood that the ratio between the portion of the second capacitor electrode 18 and the second battery electrode 20 can range from 1:10 to 10:1 (inclusive of all ratios in between those endpoints, including but not limited to, 2:9, 3:8, 4:7, 5:6, 6:5, 7:4, 8:3, and 9:2). As the portion of the second capacitor electrode 18 increases relative to the second battery electrode 20, the power density of the hybrid electrochemical cell 10 increases and the energy density decreases. Likewise, as the portion of the second battery electrode 20 increases relative to the second capacitor electrode 18, the energy density of the hybrid electrochemical cell 10 increases and the power density decreases. The ratio of the second capacitor electrode 18 relative to the second battery electrode 20 is predetermined for a given application. For example, a larger ratio of the second capacitor electrode 18 relative to the second battery electrode 20 is desirable to capture energy quickly in a regenerative braking system, while a smaller ratio of the second capacitor electrode 18 relative to the second battery electrode 20 might be desirable for energizing a power tool such as a portable electric drill.

In understanding the hybrid electrochemical cell 10, it is helpful to note that a typical lithium ion battery comprises a graphite negative electrode and a layered metal oxide positive electrode. In contrast, a lithium ion capacitor is made of a graphite negative electrode and an activated carbon positive electrode. Since the negative electrode in both designs is graphite, these two devices can be integrated into one cell by connecting internally the battery and capacitor positive electrodes in parallel. The capacitor electrode would act as a buffer to prevent high rate charge and discharge of the battery. This can potentially extend the lifetime of the battery portion of the hybrid cell by a factor of ten, leading to energy storage systems that may never need to be replaced for the lifetime of a product being powered by the hybrid electrochemical cell 10. In addition, given that the positive electrodes of the battery and the capacitor have the same operating voltage and current collector, it is possible to blend them together in one positive electrode as shown in FIG. 1. As a result, the hybrid electrochemical cell 10, in certain embodiments, has only two electrodes instead of the four electrodes used in traditional power systems having battery and supercapacitor combinations. The simplified structure and design of the present disclosure's hybrid electrochemical cell 10 reduces the manufacturing cost and make powering hybrid automobiles energy efficient. Moreover, the hybrid electrochemical cell 10 combines battery technology and supercapacitor technology into a single cell using one type of electrolyte, thereby eliminating extra current collectors, electrolyte, and packaging. This means that the hybrid electrochemical cell 10 provides a higher energy density than traditional power systems that combine batteries and supercapacitors with interfacing electronics for power flow control between the batteries and supercapacitors. The hybrid electrochemical cell 10 is fabricated using commercial electrode materials, collectors, separators, binders, and electrolytes, which allows for fabrication processes that are readily scalable to industrial levels.

In some embodiments, the first battery electrode material used comprises graphite. Other materials are also suitable. For example, in some embodiments, the first battery electrode comprises hard carbon, silicon, composite alloys Sn(M)-based and Sn(O)-based, and combinations thereof.

In certain embodiments, the second battery electrode material comprises: lithium cobalt oxide, lithium manganese oxide, lithium nickel oxide,
lithium nickel manganese cobalt oxide, lithium nickel cobalt aluminum oxide, lithium titanium oxide, and/or lithium iron phosphate, and combinations thereof.

In some embodiments, the second capacitor electrode 18 is made of a material that comprises an electric double layer capacitor (EDLC) in which charge is stored in double layers. In some embodiments, the second capacitor electrode 18 comprises interconnected corrugated carbon-based network (ICCN) 28 or activated carbon. In yet other embodiments, the second capacitor electrode 18 is redox active to store charge via intercalation pseudo-capacitance. In at least one embodiment, the second capacitor electrode 18 comprises niobium pentoxide ($Nb_2O_5$).

In further or additional embodiments, provided is a lithium ion battery that comprises or consists of two electrodes and electrolyte solution providing a conductive medium for lithium ions to move between the electrodes. In certain applications, both electrodes allow lithium ions to move in and out of their interiors. In the charge reactions, in certain embodiments of the subject matter described herein, lithium ions are deintercalated from the positive material and intercalated into the negative material. Similarly, in some embodiments, the reverse happens on discharge. The intercalation and deintercalation of lithium ions, in certain applications, causes the flow of electrons in an external circuit (not shown).

Another advantage of the subject matter described herein are methods, devices, and systems that provide for the increased movement of ions, including for example, lithium ions, into and out of the electrodes. A problem with pure lithium ion batteries is the slow movement of lithium ions in and out of the battery electrodes. As described herein, in some applications, the insertion of a supercapacitor electrode in the lithium ion-based hybrid electrochemical cell 10 speeds up the charge-discharge process by storing charge via adsorption of ions on the surface of a carbon electrode or through fast redox reactions near the surface of an oxide electrode instead of the bulk of a layered battery material. For example, in a carbon supercapacitor electrode, the charge is stored in an electric double at the interface between the carbon and electrolyte. Here, and in these applications of the methods, devices, and systems described herein, an interface between the electrodes and electrolyte is thought of as an electrical double layer composed of the electrical charge at the surface of the carbon electrode itself and the charge of the ions disbursed in the solution at a small distance from the electrode surface. This electrical double layer is formed when a potential is applied to the electrode and causes a charging current (non-faradaic current) to pass through the hybrid electrochemical cell 10. These reactions are described below.

The following equations describe the charge storage mechanism of certain embodiments of the hybrid electrochemical cell 10, for example, when using graphite as the first battery electrode and lithiated metal oxide as the second battery electrodes and carbon as the second capacitor electrode. At the positive electrode charge storage occurs through a combination of double layer adsorption capacitance and lithium ion insertion.

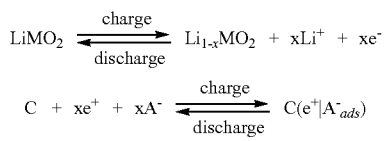

In this scheme, $LiMO_2$ represents a metal oxide positive material, such as $LiCoO_2$, x is a fraction $0<x<1$. C is a high surface area form of carbon, $e^+$ is a hole, and $A^-$ is an electrolyte anion, and ($e^+|A_{ads}^-$) refers to an electric double layer (EDL) formed at the interface between the carbon electrode and electrolyte.

At the negative electrode, lithium ion insertion into and out of graphite is described by the following equation.

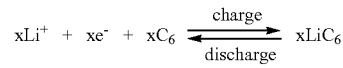

Figure 2:
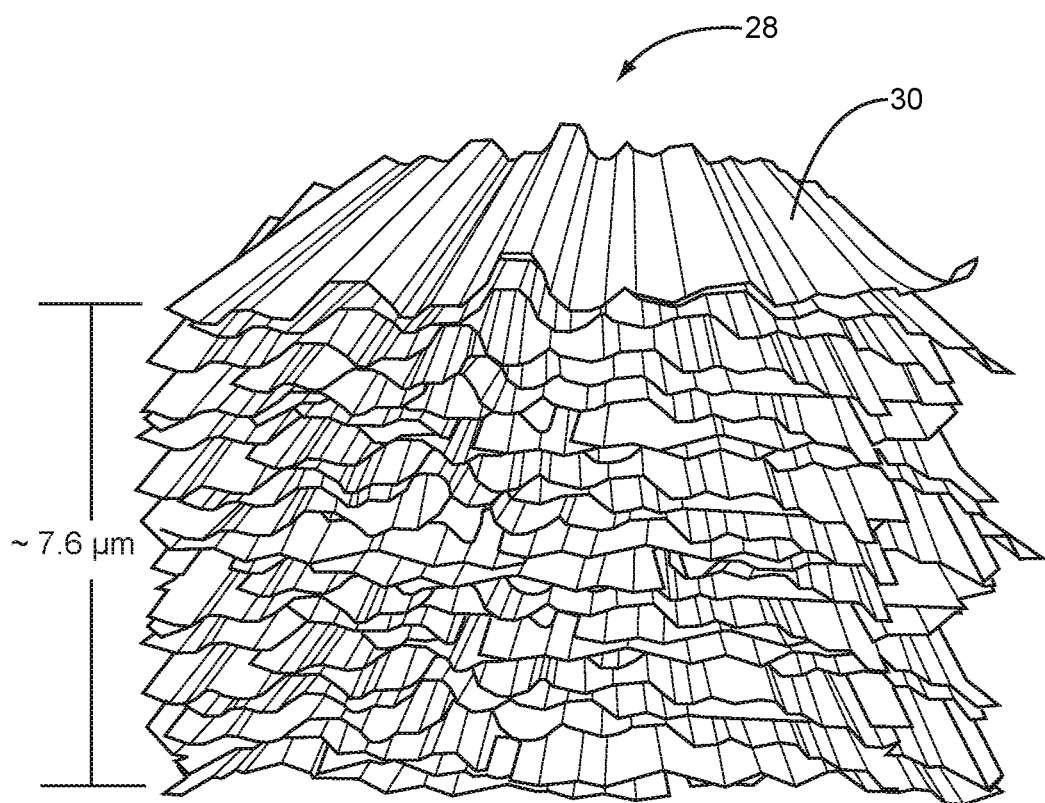
FIG. 2 is a non-limiting, illustrative depiction of a line drawing of a sample of an interconnected corrugated carbon-based network (ICCN) that is usable to make up capacitor electrodes for hybrid electrochemical cells.

FIG. 2 is a non-limiting illustration of a line drawing of a sample of an interconnected corrugated carbon-based network (ICCN) 28, which is made up of a plurality of expanded and interconnected carbon layers that include corrugated carbon layers such as a single corrugated carbon sheet 30. In one embodiment, each of the expanded and interconnected carbon layers comprises at least one corrugated carbon sheet that is one atom thick. In another embodiment, each of the expanded and interconnected carbon layers comprises a plurality of corrugated carbon sheets 30. In this specific example, the thickness of the ICCN 28, as measured from cross-sectional scanning electron microscopy (SEM) and profilometry, was found to be around about 7.6 μm. In one embodiment, a range of thicknesses of the plurality of expanded and interconnected carbon layers making up the ICCN 28 is from around about 1 μm to about 100 μm. In some embodiments, the thickness of the plurality of expanded and interconnected carbon layers making up the ICCN 28 is from around about 2 μm to about 90 μm, from about 3 μm to about 80 μm, from about 4 μm to about 70 μm, from 5 μm to about 60 μm, from about 5 μm to about 50 μm, 5 μm to about 40 μm, 5 μm to about 30 μm, 5 μm to about 20 μm, 5 μm to about 10 μm, from about 5 μm to about 9 μm, or from about 6 μm to about 8 μm.

In some embodiments, hybrid electrochemical cells in accordance with the present disclosure are also made on a micro-scale which will enable a relatively large number of applications for a new generation of electronics. For example, a micro-hybrid electrochemical cell, in some embodiments, are integrated into implantable medical devices, smart cards, radio frequency identification (RFID) tags, wireless sensors, and even wearable electronics. Integrated micro-hybrid electrochemical cells, in some applications, also serve as a way to better extract energy from solar, mechanical, and thermal sources and thus make more efficient self-powered systems. Micro-hybrid electrochemical cells, in certain embodiments, are also fabricated on the backside of solar cells in both portable devices and rooftop installations to store power generated during the day for use after sundown, helping to provide electricity around the clock when connection to the grid is not possible. Each of these applications is made possible by the subject matter described herein based in part on the flexibility in size and shape of the micro-hybrid electrochemical cells described herein. Moreover, in further or additional embodiments, provided is a thin form factor for the battery that allows for thinner portable electronics.

Figure 3:
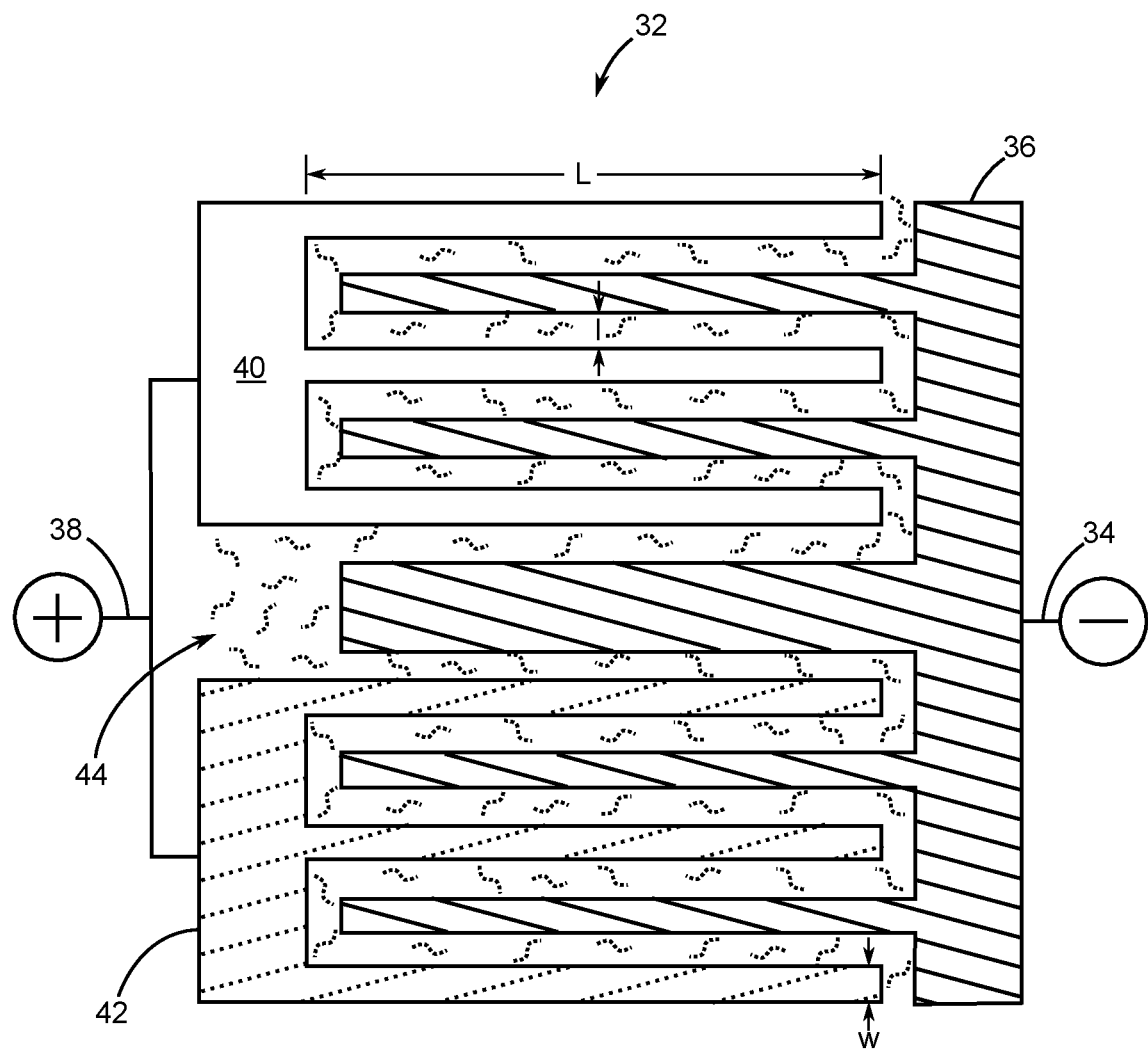
FIG. 3 is a non-limiting, illustrative depiction of a diagram depicting a Li-Ion based micro-hybrid electrochemical cell.

FIG. 3 is a non-limiting diagram illustrating a lithium ion-based micro-hybrid electrochemical cell 32. The micro-hybrid electrochemical cell 32 includes a first conductor 34 having a single portion 36 that is both a first capacitor electrode and a first battery electrode. In the lithium ion-based chemistry of the micro-hybrid electrochemical cell 32, the first conductor 34 is negative and is doped with lithium ions. The micro-hybrid electrochemical cell 32 includes a second conductor 38 having at least one portion that is a second capacitor electrode 40 and at least one other portion that is a second battery electrode 42. An electrolyte 44 is in contact with both the first conductor 34 and the second conductor 38. The second capacitor electrode 40 and the second battery electrode 42 each have electrode digits with a length L, a width W, and an interspace I. In an exemplary millimeter scale embodiment, the length L is around about 4800 µm, the width W ranges from around about 330 µm to around about 1770 µm, and the interspace I is typically around about 150 µm. While these dimensions are exemplary, it is to be understood that a further miniaturization of the width W of the electrode digits and the interspace I between the electrode digits in the micro-hybrid electrochemical cell 32 would reduce ionic diffusion pathways, thus leading to the micro-hybrid electrochemical cell 32 having even higher power density. In an exemplary centimeter scale embodiment, the length L is around about 1.2 cm, the width W ranges from around about 0.05 cm to around about 0.2 cm, and the interspace I is typically around about 0.05 cm.

In some embodiments, the micro-hybrid electrochemical cell 32 is integrated by growing porous positive and negative electrode materials on ICCN interdigitated patterns. In general, methods for producing the micro-hybrid electrochemical cell 32 having electrodes made of a patterned ICCN typically include an initial step of receiving a substrate having a carbon-based oxide film. Once the substrate is received, a next step involves generating a light beam having a power density sufficient to reduce portions of the carbon-based oxide film to an ICCN. Another step involves directing the light beam across the carbon-based oxide film in a predetermined pattern via a computerized control system while adjusting the power density of the light beam via the computerized control system according to predetermined power density data associated with the predetermined pattern. Exemplary light sources for generating the light beam include but are not limited to a 780 nm laser, a green laser, and a flash lamp. The light beam emission of the light sources may range from near infrared to ultraviolet wavelengths.

Figure 4:
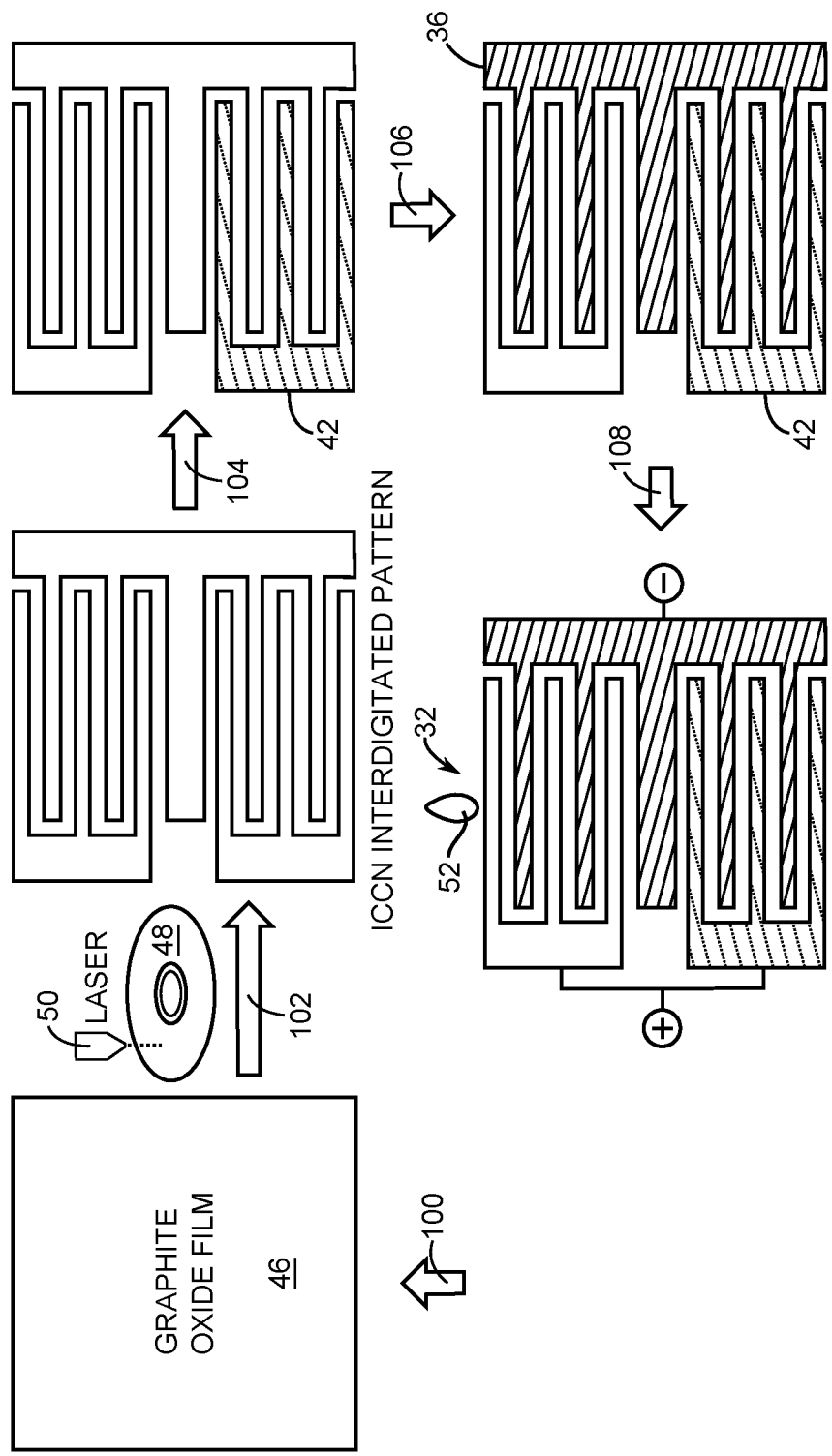
FIG. 4 is a non-limiting, illustrative depiction of a process flow diagram depicting fabrication of the micro-sized Li-Ion based hybrid electrochemical cell of FIG. 3.

An exemplary process for fabricating the micro-hybrid electrochemical cell 32 is schematically illustrated in FIG. 4. In some embodiments, the ICCN pattern is created using a consumer-grade digital versatile disc (DVD) burner drive. In a first step, a graphite oxide (GO) dispersion in water is dropcast onto a DVD disc and dried in air to form a graphite oxide film 46 (step 100). A micro-pattern made with imaging or drafting software is directly printed onto the GO-coated DVD disc 48 (step 102). The GO film absorbs the energy from a laser 50 and is converted into an ICCN pattern. With the precision of the laser 50, the DVD burner drive renders the computer-designed pattern onto the GO film to produce the desired ICCN circuits. In certain applications, the ICCN pattern is designed to have three terminals: an ICCN supercapacitor-like electrode and two battery electrodes. In some embodiments, the capacity of the supercapacitor electrode is boosted by the electrophoretic deposition of activated carbon micro-particles.

In further or additional embodiments, anode and/or cathode materials are sequentially electrodeposited on the ICCN scaffold. Voltage-controlled and current-controlled electrodeposition is used to ensure conformal coating of the active materials throughout the three-dimensional (3D) structure of the ICCN. For example, manganese dioxide ($MnO_2$) is electrodeposited on the ICCN microelectrodes making up the second battery electrode 42 (FIG. 3) that forms a portion of a cathode and is followed by a lithiation of $MnO_2$ in molten lithium nitrate ($LiNO_3$) and lithium hydroxide (LiOH) (step 104). In some embodiments, polyaniline is used as an alternative to the cathode material. Next, a nickel-tin alloy, silicon, or even graphite micro-particles are electrodeposited onto ICCN corresponding to the anode (step 106). To complete the micro-hybrid electrochemical cell 32, a drop of electrolyte 52 is added to provide ions that allow continuous electron flow when the micro-hybrid electrochemical cell 32 is under load (step 108).

In some embodiments, the micro-hybrid electrochemical cell 32 is realized using nickel-cadmium (Ni—Cd) and nickel-metal hydride (Ni-MH) chemistries in a similar manner to that of the lithium ion-based hybrid electrochemical cell 10 (see FIG. 1) except that the chemistry of Ni—Cd or Ni-MH batteries is combined with a Ni-carbon asymmetric supercapacitor.

Figure 5:
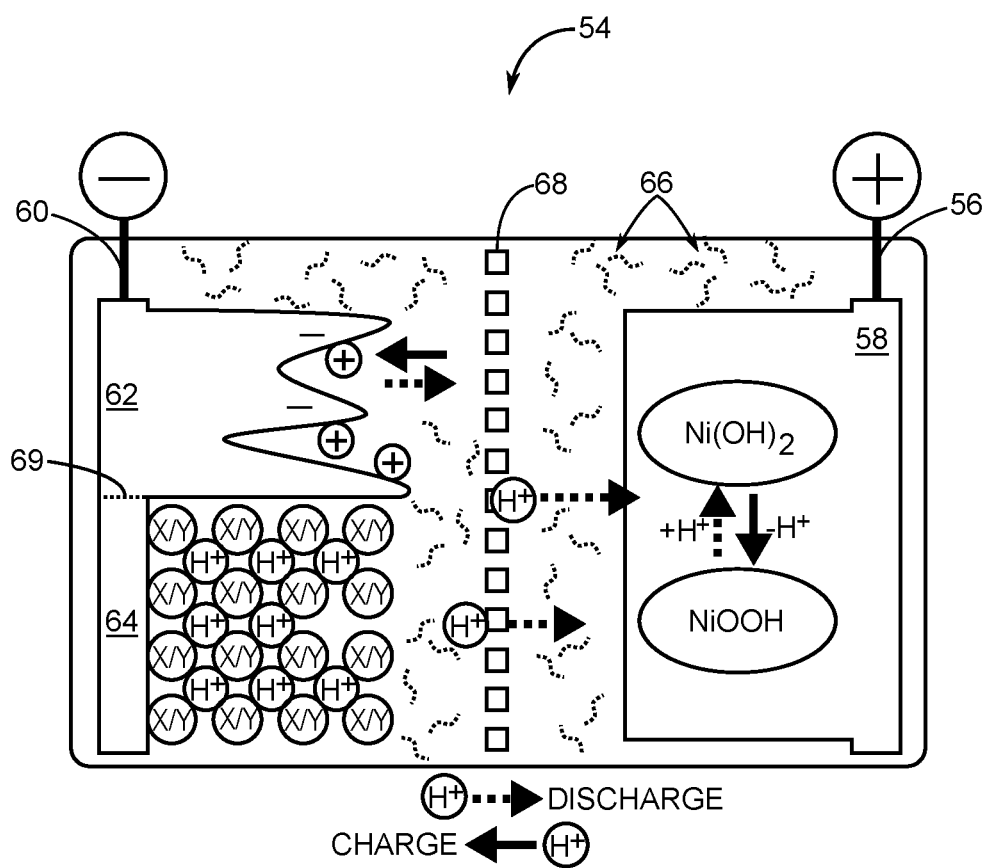
FIG. 5 is a non-limiting, illustrative depiction of an embodiment suitable for realizing hybrid electrochemical cells of either nickel-cadmium (Ni—Cd) and/or nickel-metal hydride (Ni-MH) chemistries.

FIG. 5 depicts a non-limiting structure for a hybrid electrochemical cell 54 for Ni—Cd and Ni-MH chemistries in accordance with the present disclosure. In some embodiments, the hybrid electrochemical battery cell 54 includes a first conductor 56 having a single portion 58 that is both a first capacitor electrode and a first battery electrode. In some embodiments, in either of the Ni—Cd and/or Ni-MH based chemistries of the hybrid electrochemical cell 54, the first conductor 56 is positive and includes nickel oxyhydroxide (NiOOH) that reduces to nickel hydroxide ($Ni(OH)_2$) during discharge. In some embodiments, the hybrid electrochemical cell 54 includes a second conductor 60 having at least one portion that is a second capacitor electrode 62 and at least one other portion that is a second battery electrode 64. In some embodiments, the ions that collect on the second battery electrode 64 comprise a metal hydride represented by X in the metal hydride case or $Cd(OH)_2$ represented by Y in the Ni—Cd case. In certain applications, an electrolyte 66 is in contact with both the first conductor 56 and the second conductor 60, whereby a separator 68 between the first conductor 56 and the second conductor 60 prevents physical contact between the first conductor 56 and the second conductor 60, while facilitating ion transport between the first conductor 56 and the second conductor 60. In some embodiments, the second capacitor electrode 62 and the second battery electrode 64 are delineated by a horizontal dashed line 69 in FIG. 5. As shown, a ratio between the portion of the second capacitor electrode 62 and the second battery electrode 64 is 1:1. However, it is to be understood that the ratio between the portion of the second capacitor electrode 62 and the second battery electrode 64 can range from 1:10 to 10:1 (inclusive of all ratios in between those endpoints, including but not limited to, 2:9, 3:8, 4:7, 5:6, 6:5, 7:4, 8:3, and 9:2).

In some embodiments, as the portion of the second capacitor electrode 62 increases relative to the second battery electrode 64, the power density of the hybrid electrochemical cell 54 increases and the energy density decreases. Likewise, in further or additional embodiments, as the portion of the second battery electrode 64 increases relative to the second capacitor electrode 62, the energy density of the hybrid electrochemical cell 54 increases and the power density decreases. In certain applications, the ratio of the second capacitor electrode 62 relative to the second battery electrode 64 is predetermined for a given application. For example, a larger ratio of the second capacitor electrode 62 relative to the second battery electrode 64 is desirable to capture energy quickly in a regenerative braking system, while a smaller ratio of the second capacitor electrode 62 relative to the second battery electrode 64 might be desirable for energizing a power tool such as a portable electric drill.

In certain applications this design uses a negative electrode made of activated carbon in which the charge is stored in the electric double layer, while the positive electrode is pseudocapacitive (typically NiOOH) where the charge is stored through redox reactions in the bulk of the material. An aqueous alkaline solution is used as an electrolyte in the same way as in Ni—Cd and Ni-MH batteries. Because the positive electrode in Ni—Cd and Ni-MH batteries is NiOOH, the same as in traditional Ni—Cd asymmetric supercapacitors, in certain embodiments, provided is an integration of both devices into one cell by connecting the battery and capacitor negative electrodes in parallel. In further or additional embodiments, also provided is a blend of the battery and capacitor negative electrodes into one electrode.

Figure 6:
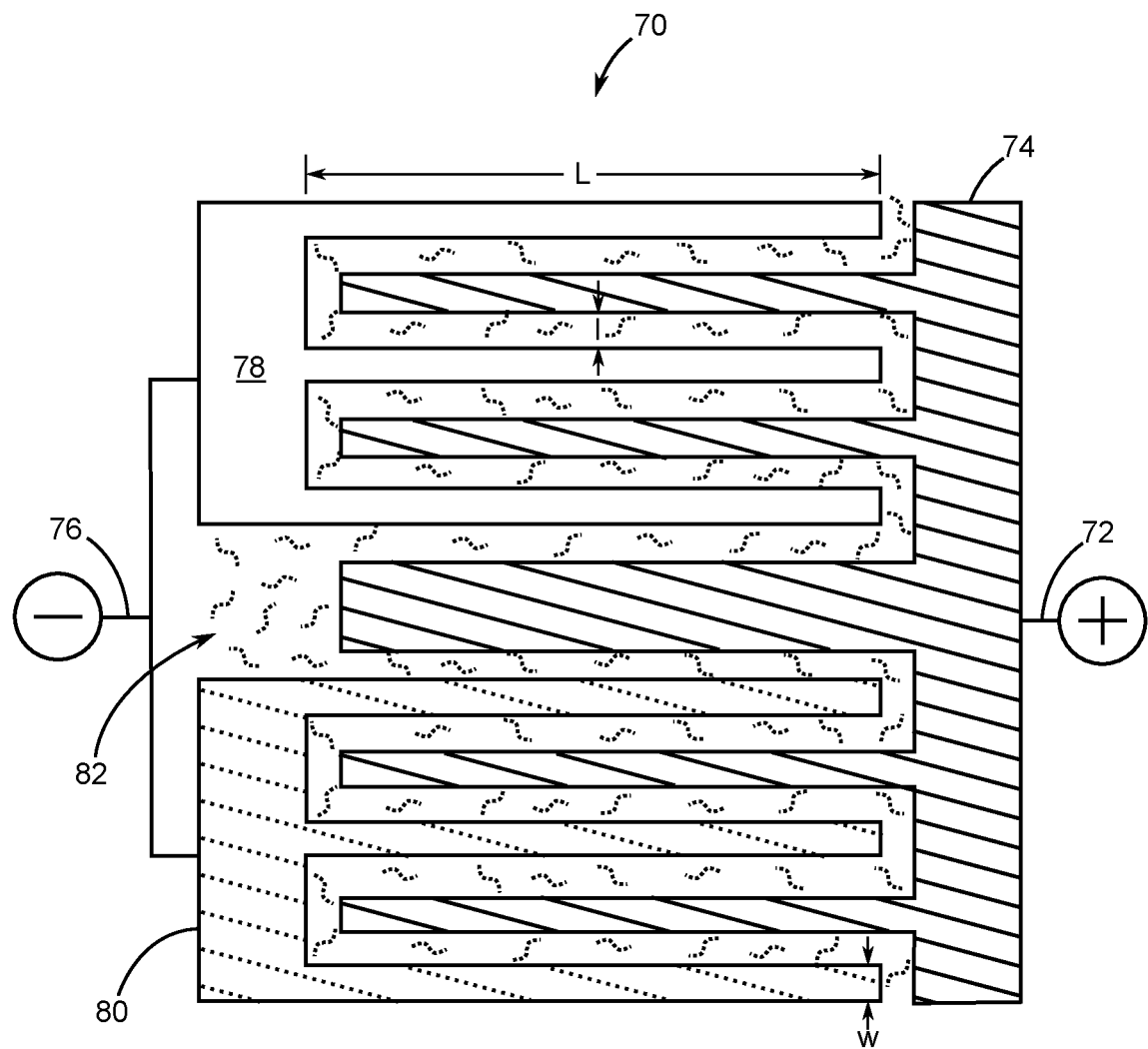
FIG. 6 is a non-limiting, illustrative depiction of a micro-sized hybrid electrochemical cell based on either Ni—Cd or Ni-MH chemistries.

FIG. 6 is a non-limiting diagram depicting a micro-hybrid electrochemical cell 70 based on either Ni—Cd or Ni-MH chemistries. In some embodiments, the micro-hybrid electrochemical battery cell 70 includes a first conductor 72 having a single portion 74 that is both a first capacitor electrode and a first battery electrode. In further or additional embodiments, during fabrication of the micro-hybrid electrochemical cell 70, the first conductor 56 is positive and is doped with NiOOH for use with either Ni—Cd or Ni-MH chemistries. In some embodiments, the micro-hybrid electrochemical cell 70 includes a second conductor 76 having at least one portion that is a second capacitor electrode 78 and at least one other portion that is a second battery electrode 80. In some embodiments, an electrolyte 82 is in contact with both the first conductor 72 and the second conductor 76. For example, the second capacitor electrode 78 and the second battery electrode 80 each have electrode digits with a length L, a width W, and an interspace I. In an exemplary embodiment the length L is around about 4800 μm, the width W ranges from around about 330 μm to around about 1770 μm, and the interspace I is typically around about 150 μm. While these dimensions are exemplary, it is to be understood that a further miniaturization of the width W of the electrode digits and the interspace I between the electrode digits in the micro-hybrid electrochemical cell 70 would reduce ionic diffusion pathways, thus leading to the micro-hybrid electrochemical cell 70 having even higher power density.

Figure 7:
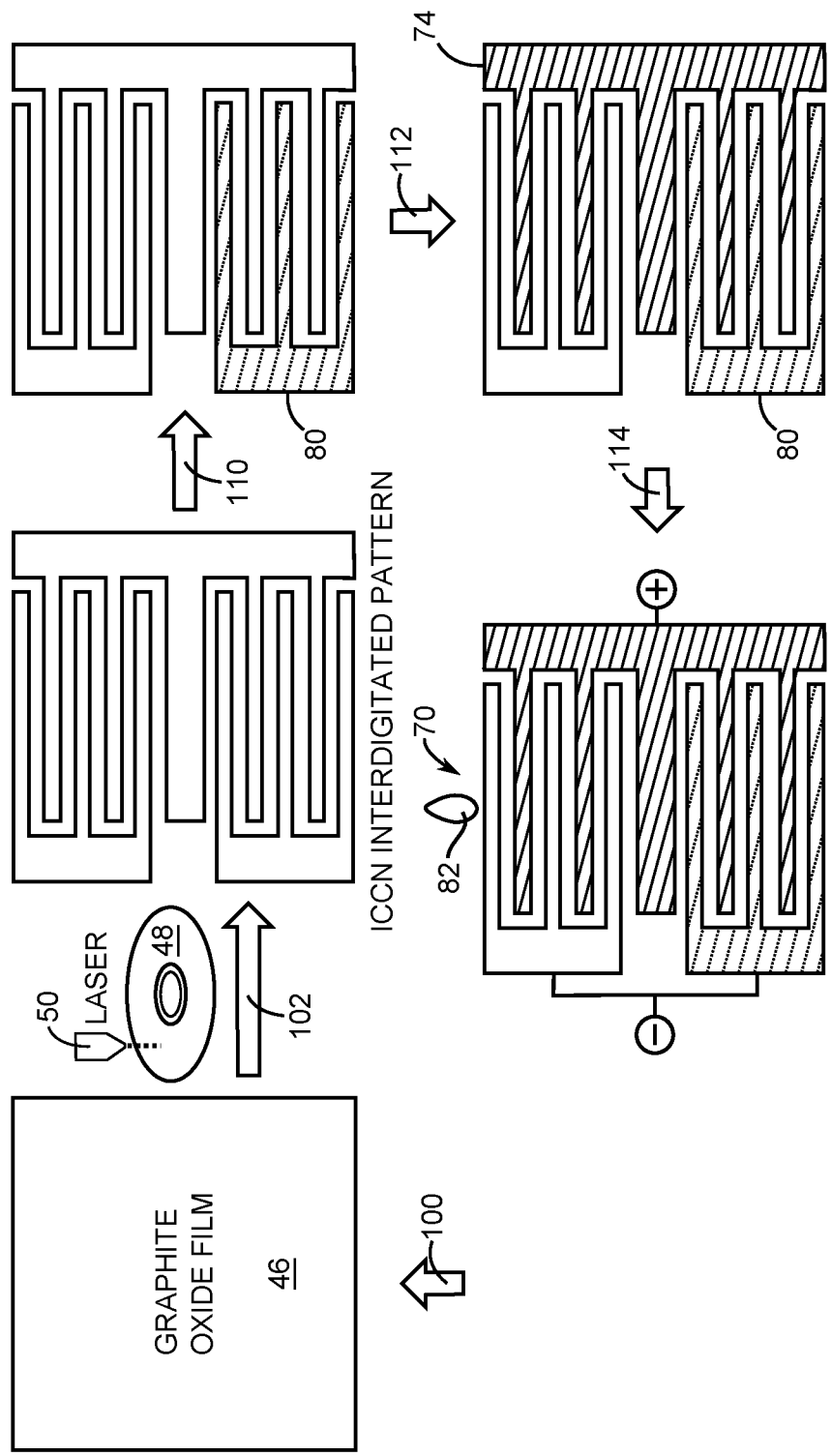
FIG. 7 is a non-limiting, illustrative depiction of a process flow diagram illustrating fabrication of the micro-sized hybrid electrochemical cell of FIG. 6.

Similar to the fabrication of the Li-Ion based micro-hybrid electrochemical cell 32, the micro-hybrid electrochemical cell 70, based on either Ni—Cd or Ni-MH chemistries, in certain embodiments is integrated by growing porous positive and negative electrode materials on ICCN interdigitated patterns. An exemplary process for fabricating the micro-hybrid electrochemical cell 70 is schematically illustrated in FIG. 7. Steps 100 and 102 are completed the same as shown in FIG. 4. However, new steps are added after step 102 to accommodate the Ni—Cd or Ni-MH chemistries to sequentially electrodeposit anode and cathode materials on the ICCN scaffold. As with the fabrication of Li-Ion based micro-hybrid electrochemical cell 32, voltage-controlled and current-controlled electrodeposition is used to ensure conformal coating of the active materials throughout the 3D structure of ICCN. A metal such as lanthanum nickel ($LaNi_5$) or palladium (Pd) is electrodeposited on ICCN microelectrodes making up the second battery electrode 80 that forms a portion of an anode (step 110). Next, $Cd(OH)_2$ is added to the ICCN corresponding to the anode (step 112). To complete the micro-hybrid electrochemical cell 70, a drop of electrolyte 82 is added to provide ions that allow a continuous electron flow when the micro-hybrid electrochemical cell 70 is under load (step 114).

The electrochemical reactions of the Ni-MH and Ni—Cd based hybrid electrochemical cells are described in the following:

Ni-MH Based Hybrid Electrochemical Cell

The negative electrode

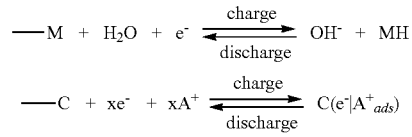

On the positive electrode

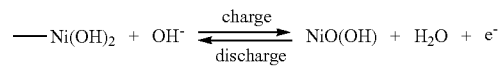

The metal, M, in the negative electrode of a Ni-MH cell, is actually a hydrogen storage alloy. It comes from a new group of intermetallic compounds which can reversibly store hydrogen. Many different compounds have been developed for this application, but the most extensively adopted is rare earth-based $AB_5$-type alloys. In this type of alloy, the A component consists of one or more rare earth elements, and B is mainly composed of transition metals such as Ni, Co, Mn, and Al. The capacitor electrode stores charge in an electric double layer. ($e^-|A_{ads}^+$) refers to an electric double layer (EDL) formed at the interface between the carbon electrode and electrolyte, where $e^-$ is an electron from the electrode side and $A_{ads}^+$ is a cation from the electrolyte side. In the Ni-MH hybrid electrochemical cell, nickel oxyhydroxide (NiOOH), is the active material in the charged positive electrode. During discharge, it reduces to the lower valence state, nickel hydroxide, $Ni(OH)_2$, by accepting electrons from the external circuit. These reactions reverse during charging of the cell.

Ni—Cd Based Hybrid Electrochemical Cell

The negative electrode

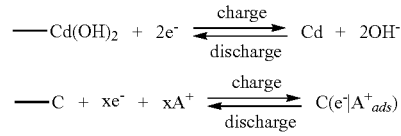

On the positive electrode

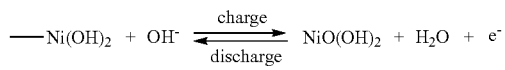

In the Ni—Cd based hybrid electrochemical cell, the negative electrode consists of cadmium metal and high surface area carbons. During charge, $Ni(OH)_2$ is oxidized to the higher valence state and releases electrons to the external circuit. These electrons are stored in the negative electrode by reducing $Cd(OH)_2$ to elemental cadmium and in electric double layers.

FIG. 8A is a charge-discharge graph of voltage versus time for a prior art lithium ion capacitor. The charge rate and the discharge rate are relatively steep in comparison to a lithium ion battery charge rate and discharge rate shown in FIG. 8B. FIG. 8C is a non-limiting charge-discharge graph of voltage versus time for a hybrid electrochemical cell of the present disclosure. Notice that in this case, and in certain embodiments of the present disclosure, the hybrid electrochemical cell has charge rates and discharge rates that are commensurate with both the lithium ion capacitor and the lithium ion battery. As a result, the hybrid electrochemical cells of this disclosure share the best properties of both the lithium ion capacitor and the lithium ion battery and therefore can be thought of as being "super-batteries."

Figure 9:
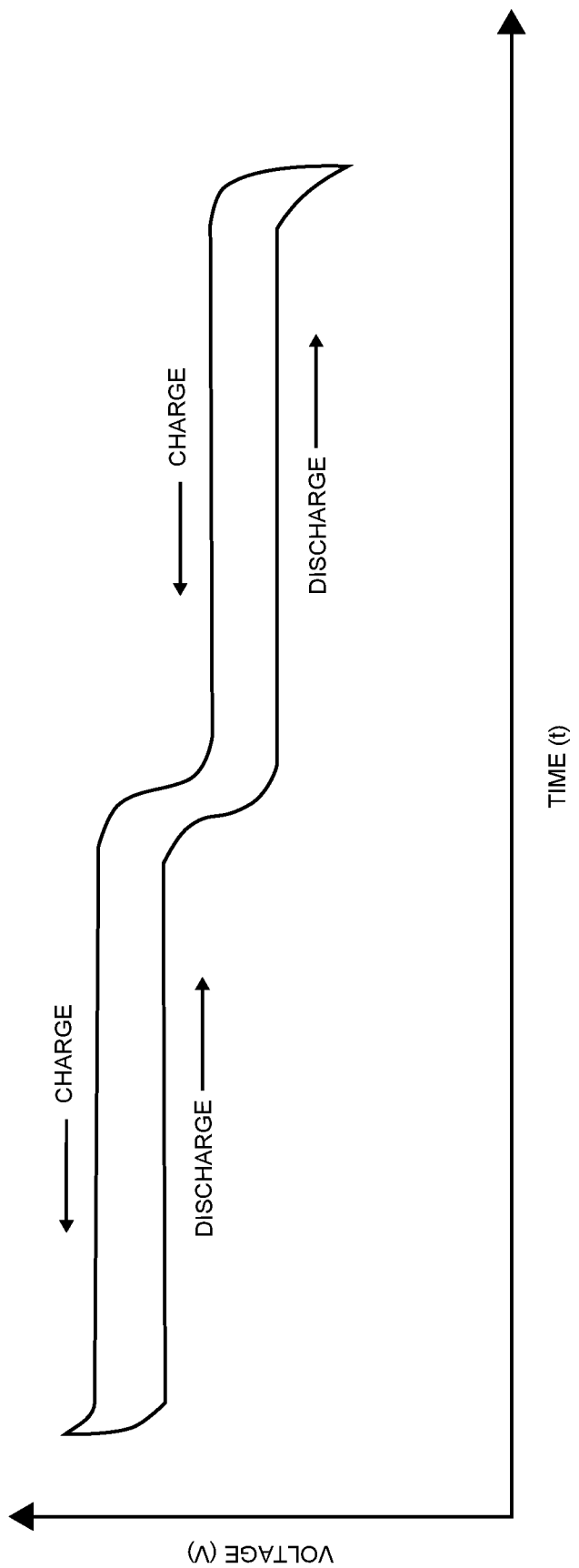
FIG. 9 is a non-limiting, illustrative depiction of a charge-discharge graph of voltage versus time for a hybrid electrochemical cell of the present disclosure that comprises redox active niobium pentoxide ($Nb_2O_5$).

The shape of the charge-discharge graph of the hybrid electrochemical cell is controlled by the type of the second capacitor electrode. For example, FIG. 8C describes the case when using a double layer capacitor electrode such as ICCN 28 or activated carbon. However, when using redox active $Nb_2O_5$, the behavior is illustrated in FIG. 9. Other materials are also suitable.

FIG. 10A is a graph depicting a charge-discharge curve for a prior art nickel-carbon supercapacitor. In contrast, FIG. 10B is a graph depicting a charge-discharge curve for both a prior art Ni—Cd battery and a prior art Ni-MH battery. FIG. 10C is a non-limiting illustration of a charge-discharge graph of voltage versus time for either of the Ni—Cd and the Ni-MH chemistries for embodiments comprising hybrid electrochemical cells of the present disclosure. In essence, the charge-discharge graph of FIG. 10C can be thought of as the result of a combination of the electrochemical properties of nickel-carbon supercapacitor and Ni—Cd or Ni-MH battery.

Figure 11:
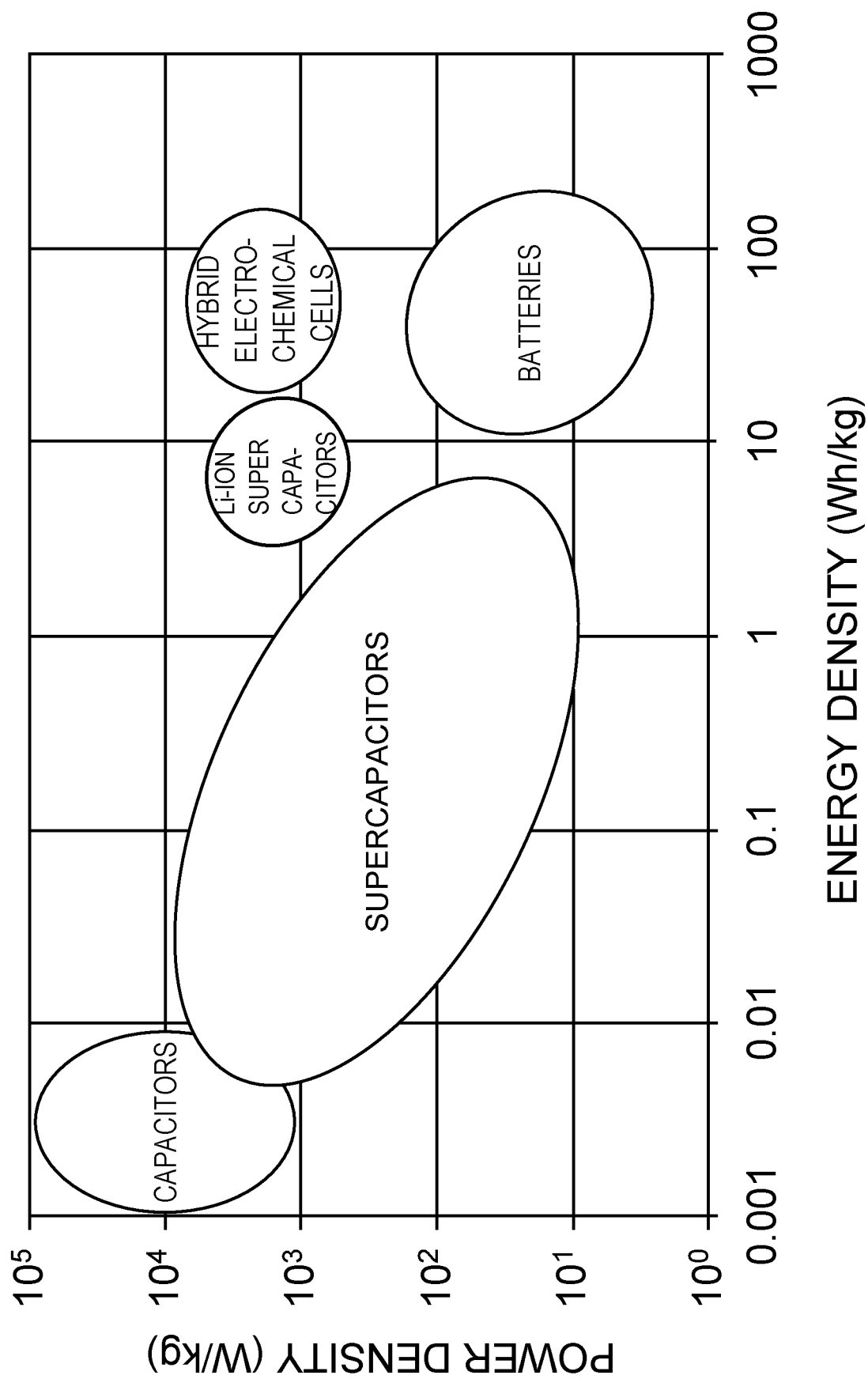
FIG. 11 is a non-limiting, illustrative depiction of a Ragone plot comparing power density versus energy density for capacitors, supercapacitors, Li-Ion capacitors, batteries, and the hybrid electrochemical cells of the present disclosure.

A Ragone plot is useful to highlight the improved electrochemical storage ability of the hybrid electrochemical cells of the present disclosure. FIG. 11 is a Ragone plot comparing the performance of hybrid electrochemical cells with different energy storage devices designed for high-power demanding loads. The Ragone plot shows the gravimetric energy density and power density of the packaged cells for all the devices tested. The Ragone plot reveals a significant increase in performance for energy density in comparison to traditional supercapacitors. Remarkably, compared with lithium ion supercapacitors, hybrid electrochemical cells of certain embodiments of the subject matter described herein store up to ten times more energy and around about the same to slightly greater power density than lithium ion supercapacitors. For example, the hybrid electrochemical cells of the present disclosure have an energy density that ranges between 20 watt-hour/kilogram (Wh/kg) to around about 200 Wh/kg. Furthermore, although lithium ion batteries can provide high energy density, they have limited power performance that is nearly two orders of magnitude lower than the hybrid electrochemical cells of the present disclosure. For example, the hybrid electrochemical cells of the present disclosure have a power density that ranges between nearly $10^3$ watt/kilogram (W/kg) to about $10^4$ W/kg. This superior energy and power performance of the hybrid electrochemical hybrids will compete, completely replace, and/or complement batteries and supercapacitors, including lithium ion supercapacitors in a variety of applications. Moreover, a further miniaturization of the width of the micro-electrodes and the space between micro-electrodes in micro-hybrid electrochemical cells would reduce ionic diffusion pathways, thus leading to micro-hybrid electrochemical cells with even higher power density.

Figure 12A:
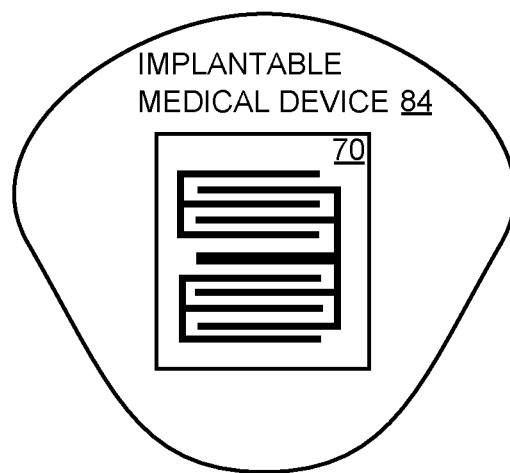
FIG. 12A is a non-limiting, illustrative depiction of an implantable medical device having a hybrid electrochemical cell of the present disclosure integrated within.
Figure 12B:
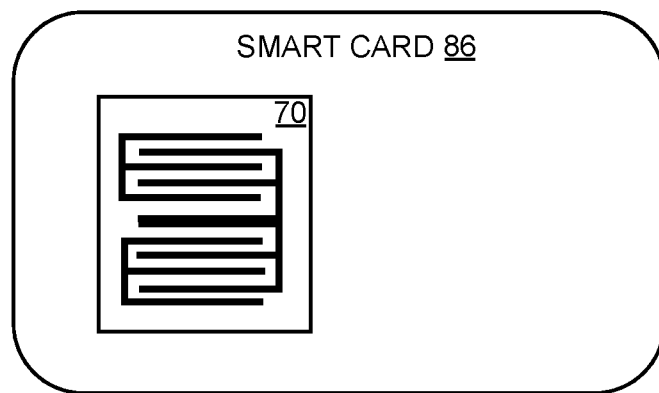
FIG. 12B is a non-limiting, illustrative depiction of a smart card having a hybrid electrochemical cell of the present disclosure integrated within.
Figure 12C:
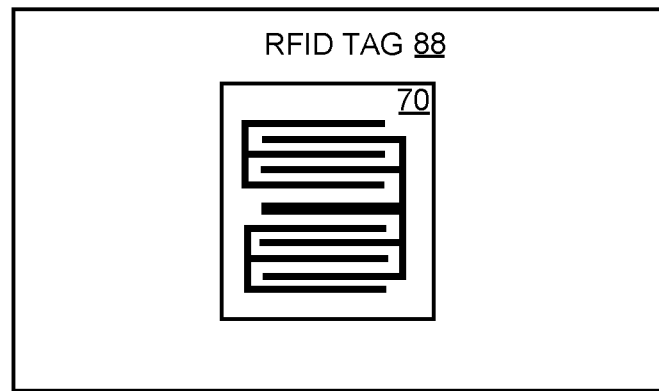
FIG. 12C is a non-limiting, illustrative depiction of a radio frequency identification (RFID) tag having a hybrid electrochemical cell of the present disclosure integrated within.
Figure 12D:
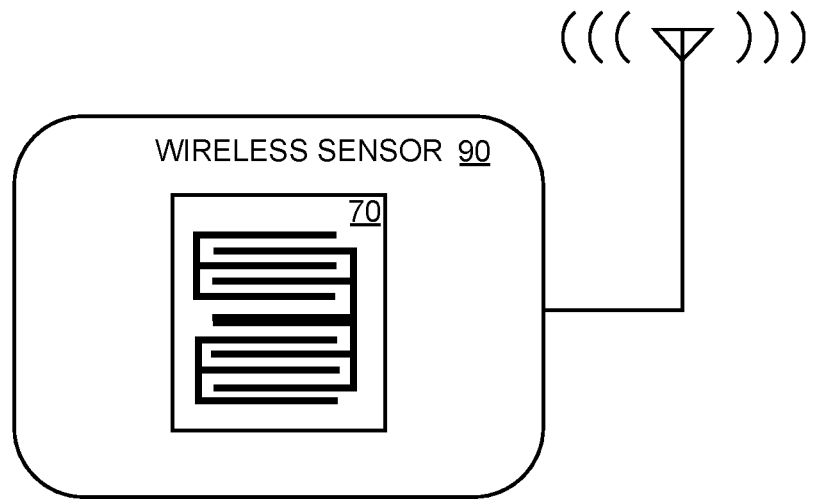
FIG. 12D is a non-limiting, illustrative depiction of a wireless sensor having a hybrid electrochemical cell of the present disclosure integrated within.
Figure 12E:
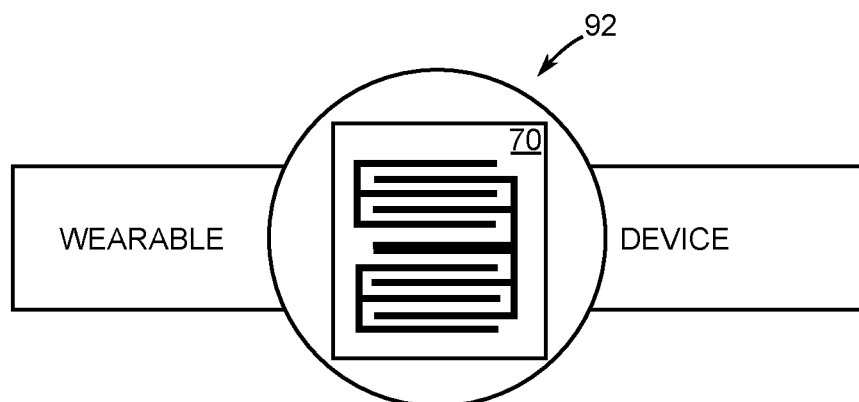
FIG. 12E is a non-limiting, illustrative depiction of a wearable device having a hybrid electrochemical cell of the present disclosure integrated within.
Figure 12F:
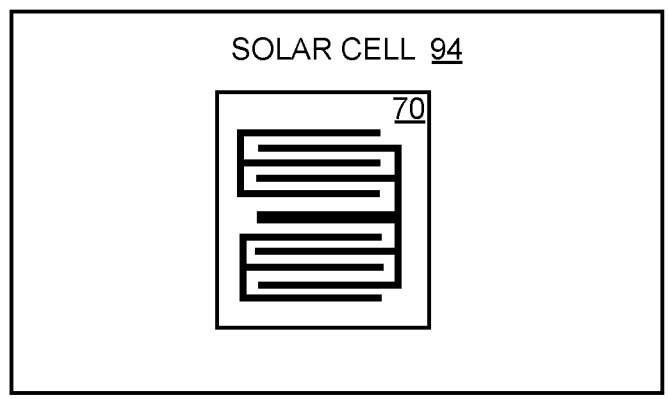
FIG. 12F is a non-limiting, illustrative depiction of a solar cell having a hybrid electrochemical cell of the present disclosure integrated with the solar cell to realize an energy harvesting system.

Applications for the disclosed embodiments of a micro-hybrid electrochemical cell are diverse. The following list is only exemplary. For example, FIG. 12A is a non-limiting, illustrative depiction of an implantable medical device 84 having the micro-hybrid electrochemical cell 70 integrated within. FIG. 12B is a non-limiting, illustrative depiction of a smart card 86 having the micro-hybrid electrochemical cell 70 integrated within. FIG. 12C is a non-limiting, illustrative depiction of a radio frequency identification (RFID) tag 88 having the micro-hybrid electrochemical cell 70 of the present disclosure integrated within. FIG. 12D is a non-limiting, illustrative depiction of a wireless sensor 90 having the micro-hybrid electrochemical cell 70 of the present disclosure integrated within. FIG. 12E is a non-limiting, illustrative depiction of the wearable device 92 having a micro-hybrid electrochemical cell 70 of the present disclosure integrated within. FIG. 12F is a non-limiting, illustrative depiction of a solar cell 94 having the micro-hybrid electrochemical cell 70 of the present disclosure integrated with the solar cell 94 to realize a self-powered system. Other self-powered systems that will benefit from integration with the present embodiments include but are not limited to vibrational type energy harvesting systems, wind energy harvesting systems, and temperature differential type energy harvesting systems.

Those skilled in the art will recognize improvements and modifications to the embodiments of the present disclosure. All such improvements and modifications are considered within the scope of the concepts disclosed herein and the claims that follow.

What is claimed is:

1. A method of producing a hybrid electrochemical cell comprising:
    (a) fabricating a first conductor having a single portion that is both a first capacitor electrode and a first battery electrode;
    (b) fabricating a second conductor having at least one portion that is a second capacitor electrode and at least one other portion that is a second battery electrode; and
    (c) adding an electrolyte to both the first conductor and the second conductor.

2. The method of claim 1, wherein fabricating the second conductor comprises:
    (a) receiving a substrate having a carbon-based oxide film; and
    (b) generating a light beam that reduces portions of the carbon-based oxide film to a plurality of expanded and interconnected carbon layers that are electrically conductive, thereby forming an interconnected corrugated carbon-based network.

3. The method of claim 1, further comprising inserting a separator between the first conductor and the second conductor.

4. The method of claim 1, further comprising doping the first conductor with lithium ions.

5. The method of claim 1, wherein the hybrid electrochemical cell comprises lithium-ion (Li-Ion) material or chemistry.

6. The method of claim 1, wherein the hybrid electrochemical cell comprises a nickel-cadmium (Ni—Cd) chemistry, a nickel-metal hydride (Ni-MH) chemistry, or both.

7. The method of claim 6, wherein the first conductor comprises nickel oxyhydroxide (NiOOH), graphite, or both.

8. The method of claim 1, wherein the first battery electrode comprises hard carbon, silicon alloy, a composite alloy, or any combination thereof.

9. The method of claim 1, wherein the second capacitor electrode comprises an electric double layer capacitor.

10. The method of claim 1, wherein the second capacitor electrode is redox active and stores charge via intercalation pseudo-capacitance.

11. The method of claim 1, wherein the second capacitor electrode comprises a layered metal oxide, activated carbon, an interconnected corrugated carbon-based network, niobium pentoxide, or any combination thereof.

12. The method of claim 11, wherein the interconnected corrugated carbon-based network comprises a plurality of expanded and interconnected carbon layers.

13. The method of claim 12, wherein the plurality of expanded and interconnected carbon layers comprises at least one corrugated carbon sheet.

14. The method of claim 13, wherein each of the at least one corrugated carbon sheet has a thickness of 1 atom.

15. The method of claim 12, wherein each of the plurality of expanded and interconnected carbon layers has a thickness of about 5 μm to 100 μm.

16. The method of claim 1, wherein the second battery electrode comprises activated carbon, lithium cobalt oxide, lithium manganese oxide, lithium nickel oxide, lithium nickel manganese cobalt oxide, lithium nickel cobalt aluminum oxide, lithium titanium oxide, lithium iron phosphate, or any combination thereof.

17. The method of claim 1, wherein a ratio between the at least one portion that is the second capacitor electrode and the at least one other portion that is the second battery electrode is about 1:10 to about 10:1.

18. The method of claim 1, wherein the hybrid electrochemical cell has an energy density of about 20 watt-hour/kilogram (Wh/kg) to about 200 Wh/kg.

19. The method of claim 1, wherein the hybrid electrochemical cell has a power density of about 103 watt/kilogram (W/kg) to about 104 W/kg.

20. The method of claim 1, wherein the first conductor and the second conductor are interdigitated.

* * * * *